(12) United States Patent
Schieder

(10) Patent No.: US 6,469,992 B1
(45) Date of Patent: Oct. 22, 2002

(54) INTELLIGENT PACKET RETRANSMISSION SCHEME

(75) Inventor: Andreas Schieder, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/175,955

(22) Filed: Oct. 21, 1998

(30) Foreign Application Priority Data

Oct. 22, 1997 (DE) ......................................... 197 46 691

(51) Int. Cl.⁷ ................................................. H04Q 7/00
(52) U.S. Cl. .................. 370/329; 370/349; 370/389; 370/401; 455/450; 455/509; 714/749
(58) Field of Search ................................ 370/329, 349, 370/389, 395, 401; 455/31.2, 31.3, 450, 509, 517; 714/748, 749

(56) References Cited

U.S. PATENT DOCUMENTS

| 4,723,624 A | * | 2/1988 | Sasuta et al. ................. 379/58 |
| 4,870,641 A | * | 9/1989 | Pattavina ..................... 370/60 |
| 4,939,731 A | | 7/1990 | Reed et al. ................... 371/32 |
| 5,729,541 A | * | 3/1998 | Hamalaimen et al. ...... 370/337 |
| 5,774,461 A | * | 6/1998 | Hyden et al. ................ 370/329 |
| 5,790,551 A | * | 8/1998 | Chan .......................... 370/458 |
| 6,058,422 A | * | 5/2000 | Ayanoglu et al. ........... 709/226 |

FOREIGN PATENT DOCUMENTS

| DE | 39 22 384 | 1/1991 |
| DE | 43 07 702 | 9/1994 |
| DE | 44 02 903 | 8/1995 |
| EP | 0 330 166 | 8/1989 |
| EP | 0 794 631 | 9/1997 |

* cited by examiner

Primary Examiner—Alpus H. Hsu
Assistant Examiner—Roberta Stevens
(74) Attorney, Agent, or Firm—Burns, Doane, Swecker & Mathis, L.L.P.

(57) ABSTRACT

To achieve an improved utilization of a radio link channel in a wireless packet oriented transmission system data packets are transmitted between a transmission apparatus (10) and a mobile unit (14), respectively. Then it is determined whether a data packet transmission between the transmission apparatus (10) and the mobile unit (14) has been carried out successfully. Here, a transmission channel (16) is reassigned to another mobile unit (14) in a case that it is determined that the transmission of the data packet was not successful and further a retransmission of a data packet is estimated to be not successful.

29 Claims, 17 Drawing Sheets

ELEMENTS OF AN ATM NETWORK

WIRELESS ATM ENVIRONMENT

INTELLIGENT PACKET RETRANSMISSION SCHEME

FIELD OF THE INVENTION

This invention relates to an intelligent packet retransmission scheme, and in particular to an intelligent packet retransmission scheme that aims at improving the utilization of wireless links in environments where so-called fading phenomena prevail.

BACKGROUND OF THE INVENTION

In wireless communication systems radio waves propagate through space as travelling electromagnetic EM waves. The energy of signals exists in the form of electrical E and magnetic H fields. Both electrical and magnetic fields vary sinusoidally with time. The two fields always exist together because a change in electrical field generates a magnetic field and a change in magnetic field generates an electrical field. Thus, there is a continuous flow of energy from one field to the other.

Radio waves arrive at a mobile station in a wireless communication system from different directions with different time delays. They combine via vector addition at the receiver antenna to give a resulting signal with a large or small amplitude depending upon whether the incoming waves combined to reinforce each other or cancel each other. As a result, a receiver at one location may experience a signal strength several tens of dB different from a similar receiver located only a short distance away. As the mobile station moves from one location to the other, the phase relationship between the various incoming waves also changes. Thus, there are substantial amplitude and phase fluctuations and the signal is subjected to fading. It should also be noted that whenever relative motion of the mobile station exists, there is also a Doppler shift in the received signal.

In the mobile radio case, the fading and Doppler shift occur as a result of motion of the receiver through a spatially varying field. Further, it also results from the motion of scatterers of the radio waves, e.g., cars, trucks, vegetation. Thus, the effect of multipath propagation is to produce a received signal with an amplitude that varies quite substantially with location. In addition, at UHF and higher frequencies, the motion of scatterers also causes fading to occur even if the mobile set or handset is not in motion.

FIG. 19 illustrates the overall fading characteristics of a mobile radio signal. Here, the rapid fluctuation caused by the local multipath is known as fast fading or Rayleigh fading.

FIG. 20 shows the basic mechanism underlying this fading phenomenon. As mobile telephony becomes more and more popular, the subscriber density in particular in cities is continuously increasing. Thus, using a mobile station in such an environment gives rise to the amplitude and phase fluctuation explained above. As shown in FIG. 20, radio waves arrive from different directions so that the signal takes more than one path from the transmitting antenna T to the receiving antenna R. The signal is not received directly from the transmitting antenna, but also from other directions where it has bounced, e.g., building B1 to B6. Overall, the signal(s) reach(es) the mobile station MS via several reflections against these buildings B1 to B6.

This means that the received signal is the sum of many identical signals which differ, e.g., only in phase and to some extent also in amplitude. This eventually means that the sum of the identical signal turns out to be very close to zero and that the signal strength also comes very close to zero, the worst case fading dip.

As shown in FIG. 21, another kind of fading results from shadowing effects, i.e. the use of the mobile station in an environment with obstacles. According to FIG. 21 there may exist hills H and buildings B between the transmitting antenna T and the receiving antenna R of the mobile station MS so that the received signal is decreased in strength.

The fading caused by shadowing effects is called log-normal fading since the logarithm of the signal strength takes the form of a normal distribution around some mean value. Typically, the distance between two minima or fading dips is some 10 to 20 meters. A fading effect being strongly related to the log-normal fading is the so-called rice fading. In particular, in systems that rely on a free line of sight between the sending antenna T and receiving antenna R this effect occurs, when the line of sight is disturbed. In this case the signal strength will decrease dramatically when the line of sight is blocked and the receiving antenna only receives signals being reflected.

Further, according to FIG. 19 the third phenomenon reducing the signal strength versus distance is the path loss which occurs when the received signal becomes weaker and weaker due to an increasing distance between the transmitting antenna T and the receiving antenna R. The higher the frequency, the higher the attenuation.

Finally, as shown in FIG. 22 the transmission of data packets leads to the phenomenon of time dispersion. Time dispersion, too, has its origin in reflections but contrary to the multipath fading reflected signals come from objects far away from the receiving antenna R, i.e. in the order of kilometers. Time dispersion leads to inter symbol interferences where consecutive symbols interfere with each other so that it is difficult on the receiver side to decide which actual symbol has been detected.

Since reflected signals come from objects far away instead of a single transmitted pulse there may be received a plurality of distinct pulses according to the long distances and associated delay times. Therefore in case, e.g., the sequence 1, 0 is sent from the transmitting antenna as shown in FIG. 22 in case reflected signals arrive exactly 1 bit time after the direct signal, the receiving antenna will detect a value of 1 from the reflected signal at the same time as it detects a value of 0 from the direct wave so that both symbols interfere.

As outlined above, all wireless systems have to cope with the unreliable nature of the radio link. The loss of single bits or a row of bits belongs to the natural character of a radio link. Also, the loss of information is caused by varying signal strength making communication impossible in case it drops under a certain threshold.

To overcome the problem of varying signal strength a number of mechanisms are used at different protocol levels. These mechanisms are, e.g., forward error correction, power control, frequency hopping and retransmission.

According to the invention, in particular the case of retransmission in case of data loss and the improvement of the underlying schemes are considered. Here redundancy may be added to the data to be transmitted which allows to detect transmission errors at the receiving side. The amount of redundancy is determined such that the detection of bit errors is enabled, but not the correction thereof. In case the receiver detects such a bit error, it requests the transmission of the responding data once again. This is usually achieved through a negative acknowledgement sent to the sender.

Further, acknowledgement must be sent for every transmitted data item over the unreliable radio link. These acknowledgements can be put together and acknowledge either a number of data items or each data item separately.

The appropriate way of sending acknowledgement is decided according to the amount of additional signalling information and delay experienced by the end user that has to taken into account. Once the acknowledgement in retransmission scheme is specified every data loss is handled in the same way irrespective of the type of disturbance. Even worse, data not crossing a certain threshold are not treated at all since the complete connection is lost in case the duration of disturbance becomes too long.

SUMMARY OF THE INVENTION

In view of the above, the object of the invention is to achieve an improved utilization of a radio link channel accessed by multiple users in a wireless packet-oriented transmission system.

According to one aspect of the invention this object is achieved through a transmission apparatus for a wireless communication system.

One important advantage of the invention is that the invention provides a mechanism for improved utilization of wireless data links in environments which have to cope with fading phenomena by distinguishing different disturbances of the radio link. Thus, it is possible to achieve an impact of different fading effects on to a retransmission scheme as the retransmission scheme depends on the kind of disturbance and the reason therefor.

Another advantage of the invention is that it is not restricted to a specific wireless communication system but may be applied to any system wherein data is transmitted in data packets, example given the GPRS General Packet Radio Service System or the ATM wireless communication system.

Further, the benefits of the invention grow with the increase in transmission rate as here the use of radio link resources for other users in case of the detection of long lasting disturbances allows for the transfer of an increased amount of data.

Overall, according to the invention retransmission attempts are only made in case there is a chance for success.

Also, according to another aspect of the invention this object is achieved through a mobile unit for a wireless communication system according to claim 31.

Thus, the mobile unit according to the present invention is adapted to take into account that disturbances may occur on the radio channel link in the mobile unit to the respective transmission apparatus and that information on the kind of disturbance may easily be derived from the signal received at the mobile unit.

Therefore, different disturbances, i.e. Rayleigh fading, log-normal fading, path loss fading, etc., can be classified at the mobile unit. According to the present invention it is proposed to then retransmit the information on the kind of disturbance to the related transmission apparatus that therefore may avoid any unsuccessful data packet transmission attempts.

Since the acknowledgement message sent by the mobile unit already contains information classifying the kind of disturbance, it is possible to immediately reassign transmission channels within the transmission apparatus without carrying out additional transmission attempts. Also, using the mobile unit according to the invention it is possible to take precaution against different disturbance phenomena with an improved monitoring of these disturbance phenomena. Also, using location specific information on the disturbances it is possible to enhance the utilization of the scarce radio resources.

BRIEF DESCRIPTION OF THE FIGURES

Preferred embodiments of the invention will be described with respect to the accompanied drawing wherein.

DESCRIPTION OF PREFERRED EMBODIMENTS

In the following, different aspects of the inventive retransmission scheme and the application thereof will be described as follows:

Firstly, a transmission apparatus in the most general form suitable for the application of the inventive retransmission scheme will be described. Secondly, another aspect of the present invention is related to a mobile unit roaming in the wireless communication network and being adapted to set up acknowledgement messages indicating the related transmission apparatus about the kind of disturbance. Thus, it is possible to avoid any retransmission in the transmission apparatus when the acknowledgement already contains information about possible disturbances. Thirdly, different scenarios of the application of the inventive retransmission scheme in a GSM general packet radio service GPRS wireless communication network will be discussed taking into account different aspects of communication, i.e. data transfer and mobility management, respectively. Fourthly, the application of the inventive retransmission scheme and the transmission apparatus and mobile unit according to the first and second aspect of the invention to an ATM wireless communication network will be described with respect to specific examples therefore.

Figure 1:
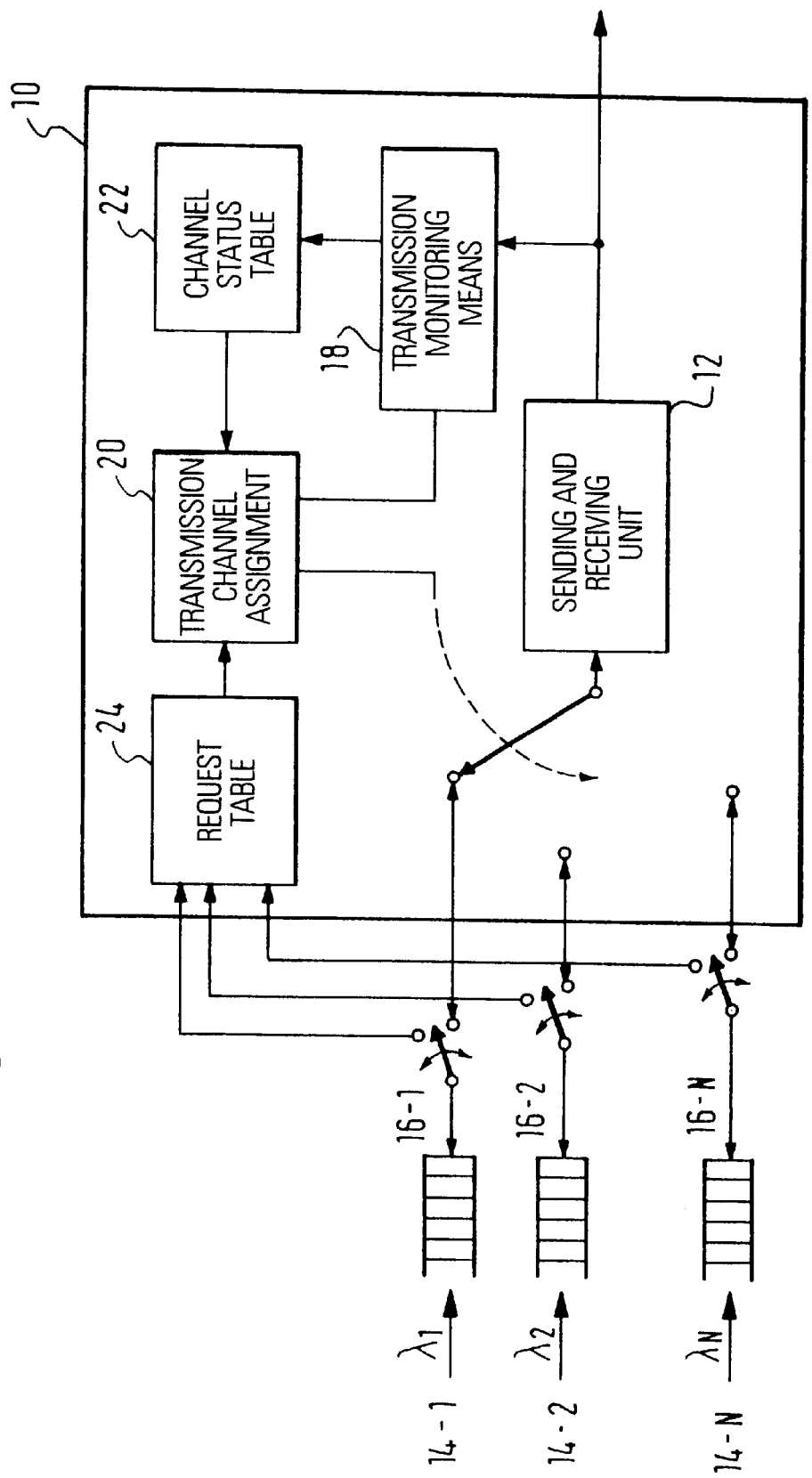
FIG. 1 shows a schematic diagram of the transmission apparatus according to the present invention.

FIG. 1 shows a schematic diagram according to a transmission apparatus 10 being related to the first aspect of the invention. Here, the transmission apparatus 10 comprises a sending and receiving unit 12 to transmit data packets to and from at least one roaming mobile unit 14 connected to the transmission apparatus 10 via a radio link 16. Further, the transmission apparatus 10 comprises a transmission monitoring unit 18 connected to an output of the sending and receiving unit 12 to determine whether a transmission between the sending and receiving unit 12 and the mobile unit 14 has been carried out successively. A transmission channel assignment unit 20 is connected to the transmission monitoring means 18 and serves to change the assignment of radio channels between the transmission apparatus 10 and mobile units 14. Further, the transmission channel assignment unit 20 is connected to a channel status unit 22 and table, respectively, and also to a request table unit 24, respectively. The function of the channel status table unit 22 is to store the status of the radio link supported by the transmission apparatus 10, e.g., as available or blocked. Also, the request table unit 24 serves to manage request of mobile units 14 for an up link and down link radio channel, respectively.

Figure 11:
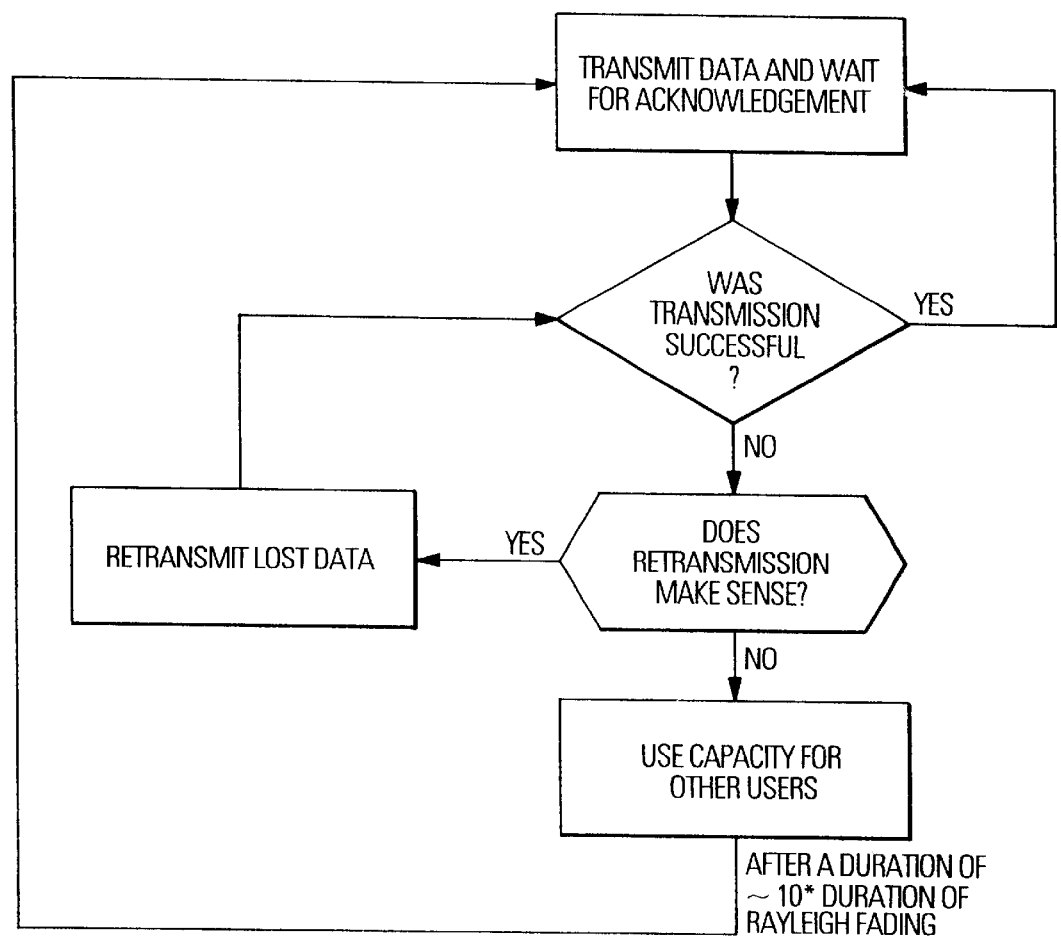
FIG. 11 shows a basic flow diagram of the retransmission scheme according to the present invention.

In the following, the function of the transmission apparatus 10 according to the present invention will be described. To this end, it may be assumed that a radio link channel for the data packet transmission is established between, e.g., the mobile unit 14-1 and the sending and receiving unit 12. During normal operation data packets are continuously transmitted between the mobile unit 14-1 and the sending and receiving unit 12 while the transmission monitoring unit 18 waits for acknowledgement, as shown in FIG. 11. In particular, the transmission monitoring unit 18 continuously determines whether a data packet transmission has been successful or not. If this is not the case, the transmission monitoring unit 18 further determines the chance for a successful retransmission of the same data packet. An example for such an evaluation would be that after several retransmissions it is assumed that any further attempts again will not be successful so that any further transmission attempts would lead to an additional loss of radio resources.

In this case, the transmission monitoring unit 18 will activate the transmission channel assignment unit 20 to switch the communication path to another mobile unit 14-2, . . . , 14-n, and radio channel, respectively.

As shown in FIG. 1, several ways to implement such a reassignment are possible. A straightforward approach would be to scan the radio link channel 16-1, 16-2, . . . , 16-N sequentially. Another option would be to additionally connect the transmission channel assignment unit 20 to a general status table unit 22 so as to avoid a reassignment to a radio channel that is currently being blocked. A reason for this may be that a mobile unit 14 is, e.g., currently in the standby modus and thus not available or that a specific radio channel is reserved for other applications.

As shown in FIG. 1, to each mobile unit 14 there is assigned a queue $\lambda 1, \lambda 2, \ldots, \lambda N$ to store requests for an up link and down link channel, respectively, at the side of the mobile unit. Further, in case a mobile unit 14 is not communicating with the sending and receiving unit 12 it may feed the communication requests in the different queues to the request table unit 24 of the transmission apparatus 10. This allows to achieve a further speed up of communication between the mobile unit 14 and the transmission apparatus 10 since the transmission channel assignment unit 20 may select the mobile unit 14 to be connected next either directly by skipping mobile units where no request prevails or by using priorities assigned to different requests so as to avoid any delay for high priority communication requests.

As already outlined above the first aspect according to the present invention is based on an approach where a transmission of data packets is repeated until it is determined that further retransmission will not be successful in case a prespecified time since the first transmission attempt has elapsed. On typical example would be that a disturbance is not caused by a short-term Rayleigh fading effect, but by a longer lasting log-normal fading effect. Here, in case a data packet could not be transmitted for longer than a prespecified time duration, e.g., 20 milliseconds, the transmission monitoring unit 18 would assume that the effect would last longer, e.g., 100 milliseconds and thus classify the disturbance as log-normal fading. In case the transmission monitoring unit 18 activates the transmission channel assignment unit 20 after 20 milliseconds have elapsed, the remaining 80 milliseconds may be used for other retransmission tries thus improving the transmission performance of the transmission apparatus 10 considerably. To make this first aspect according to the invention work, it is required that the acknowledgement received by the mobile unit 14 are sent in shorter time intervals as disturbances last, e.g., every 10 milliseconds. Another prerequisite in this case is that data packets have a small size such as, e.g., 53 byte ATM cells in an ATM wireless communication system.

As can be seen from the above, the first aspect of the present invention relates to a case where the transmission apparatus 10 only receives a standard acknowledgement message from the mobile unit 14 without any specific information on the quality of the radio link between the transmission apparatus 10 and the mobile unit 14. Thus, it is necessary to repeat a transmission at least several times to determine the successive of a retransmission attempt.

According to the second aspect of the present invention it is proposed to avoid such attempts by providing a mobile unit outputting acknowledgement messages containing information with respect to the quality of the radio link. Here, it should be noted that of course such information usually can only be derived at the side of the mobile unit 14, since only here the actual receiving conditions for radio transmission can be checked on.

Figure 2:
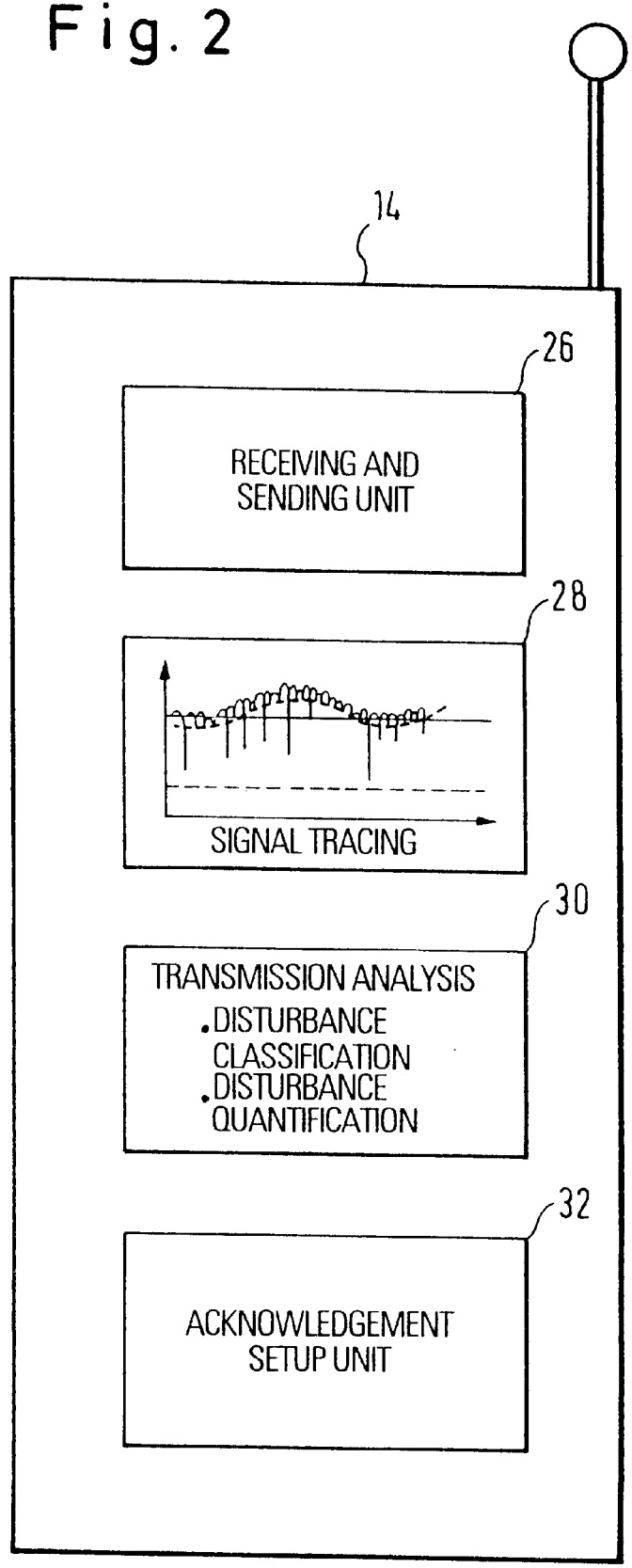
FIG. 2 shows a schematic diagram of a mobile unit to be used within a wireless communication system according to the present invention.

FIG. 2 shows an embodiment of a mobile unit 14 according to the second aspect of the invention which may provide information about the strength and characteristics of a received signal with an acknowledgement message retransmittted to the transmission apparatus 10, shown in FIG. 1.

As shown in FIG. 2, the mobile unit 14 comprises a sending and receiving unit 26 to transmit data packets to and from the transmission, apparatus 10. Further, the mobile unit 14 comprises a signal tracing unit 28 to trace the course of the signal received by the sending and receiving unit 26. Further, the mobile unit 14 comprises a transmission analyzing unit 30 receiving the traced signal as input and used to determine whether a disturbance has occurred during signal transmission. Also, the transmission analyzing unit 30 is adapted to quantify the kind of disturbance. In addition, an acknowledgement set up unit 32 received the output signal of the transmission analyzing unit 30 and is adapted to provide an acknowledgement message comprising the kind and amount of disturbance that has occurred during the transmission of a signal. As shown in FIG. 2, the acknowledgment set up unit 32 may send the acknowledgement back to the transmitting apparatus 10 via the receiving and sending unit 26.

The major difference between the second aspect of the present invention over the first aspect described with respect to FIG. 1, is that due to the insertion on information with respect to the kind of disturbance into the acknowledgement message retransmitted by the mobile unit 14 a repeated transmission of data packet by the transmission apparatus 10 to detect a disturbance of the radio channel is no longer necessary. To the contrary, in case an acknowledgement message indicating a disturbance is transmitted by the mobile unit 14 shown in FIG. 2 to the transmission apparatus 10 shown in FIG. 1, the transmission monitoring unit 18 may immediately activate a reassignment of a transmission channel thus saving unnecessary retransmission tries and further improves transmission efficiency within the wireless communication system.

In the following details and principles underlying the transmission analysis unit 30 according to the invention will be discussed. To this end, also the background theory underlying the inventive approach will be briefly summarized as far as the present invention is concerned.

It will be explained how the transmission analysis unit 30 and the mobile unit 14 may detect the Rayleigh fading. According to the present invention, two estimates are provided to determine such a Rayleigh fading, i.e. the estimation of the distance between two fading minima and further, a level crossing rate of a received signal at a specified level.

Figure 3:
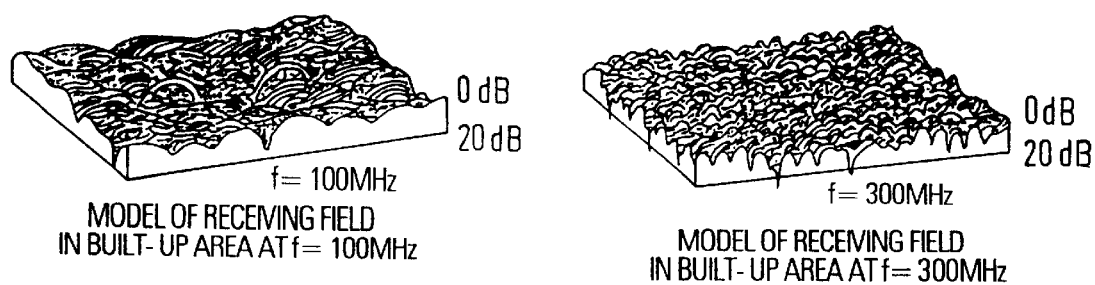
FIG. 3 shows the angle geometry being related to radio channels in a wireless communication system and the analysis of fading phenomena.

Generally, according to the second aspect of the invention, a first order estimate of the distance between two fading minima is $$d = \lambda/2 \tag{1}$$

where $\lambda$ is the wave length of the RF signal. This can also be derived from FIG. 3 showing a typical amplitude variation due to Rayleigh fading, where the time unit is the time to move through one wavelength.

Here, the distance between two minima is about d=16.7 cm for, e.g., GSM Communication Systtem at f=900 MHz. The size of fitting minima could be estimated to s=1.67 cm for GSM systems at 900 MHz. While here a value according to s=d/10 is specified, according to the present invention any value is suitable that allows for a clear distinction. Assuming that a mobile is moving at a velocity v and that the wavelength of the radio signal is $\lambda$, the time between two fading minima is determined to $$\tau = \lambda/(2v) = d/v \tag{2}$$

Thus, assuming the distance of 16.7 cm for a GSM system at f=900 MHz and assuming that a mobile receiver is driving with a speed of 50 km/h, the time between two fading dips will be approximately 10.7 ms. Assuming that the speed is 5 km/h, the duration of a mobile station in such a fading minima can be estimated to 16.2 ms. For a wireless communication system operating at 5 GHz the duration would be 2.16 ms. These figures give an impression on the effects of Rayleigh fading and thus one can regard the effects of Rayleigh fading as short disturbances of up to 20 ms duration, as outlined above.

Thus, according to this first order estimate for the Rayleigh fading phenomenon the transmission analysis unit 30 will determine a Rayleigh fading in case an estimated duration between two fading minima is lower than a prespecified threshold value, e.g., the 20 milliseconds outlined above. In this case, the acknowledgement set up unit 32 will comprise information indicating the distance of a Rayleigh fading phenomena and also the duration between two Rayleigh fading minima. In this case, the transmission apparatus 10 shown in FIG. 1 can immediately carry out a reassignment of a radio channel without repeated retransmission attempts.

However, as will be shown in the following, the second aspect of the present invention may also be implemented with an improved estimation approach relying on the characterization of the Rayleigh fading with improved accuracy. In particular, this improved estimation technique relies on an analysis of the received signal as follows.

In general, a received signal s(t) is expressed as a product of two parts, the signal subject to long term fading m(t) and the signal subject to short term fading r(t).

$$s(t) = m(t) \cdot r(t) \tag{3}$$

Figure 5:
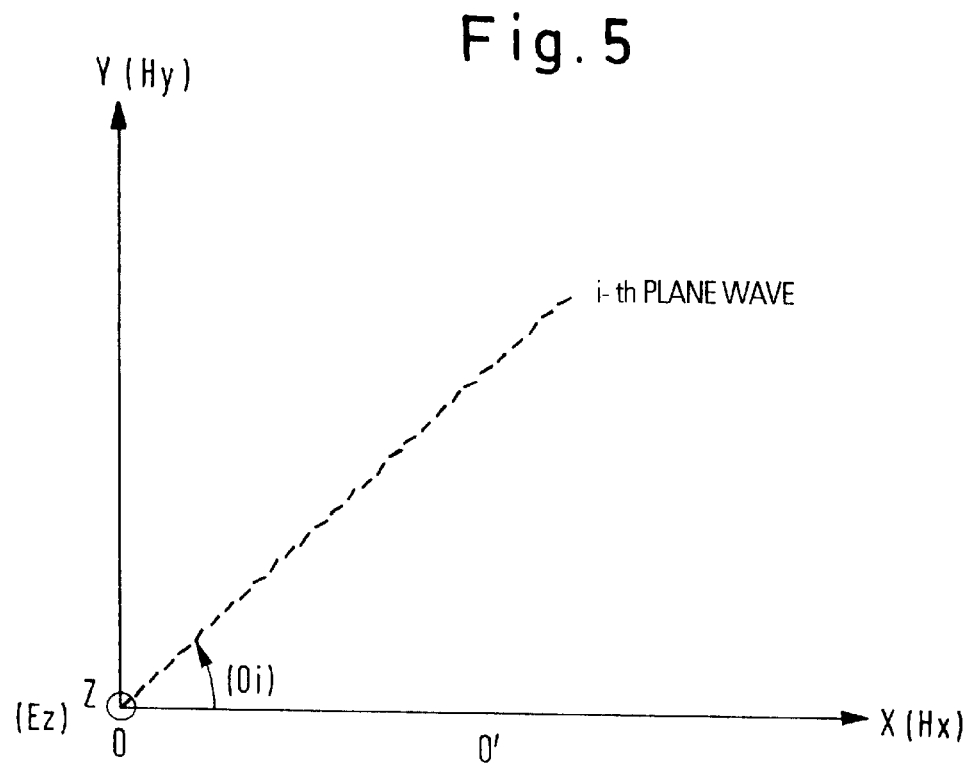
FIG. 5 shows a model of receiving field in an built up area at a frequency of 100 MHz and 300 MHz, respectively.
Figure 6:
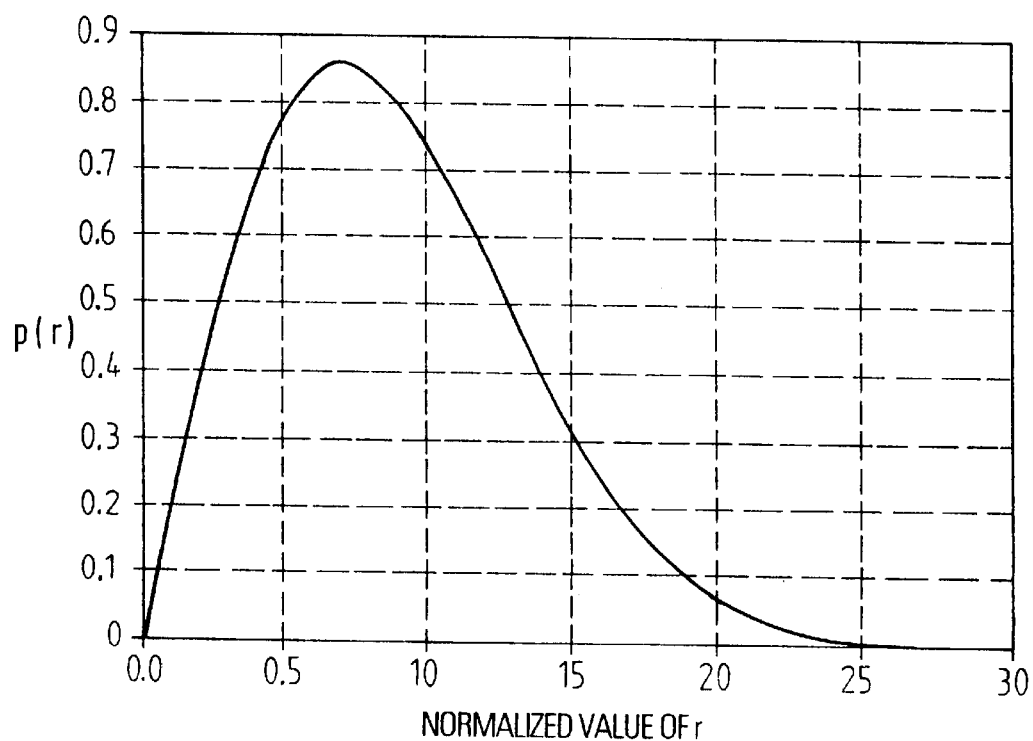
FIG. 6 shows an example of amplitude variation over time according to Rayleigh fading.

For the analysis of different fading effects it is assumed that at every receiving point there exists N plane waves of equal amplitude of which the Z-axis is perpendicular to the X-Y-plane as shown in FIG. 5. This FIG. 5 also shows the path angle geometry for the i-th scattered plane wave. In case the transmitted signal is vertically polarized, i.e. the electrical field vector is aligned along the Z-axis, the field components at the receiving mobile station are the electrical field $E_z$, the magnetic field $H_x$, and the magnetic field $H_y$. These components at the receiving point are expressed in the complex equivalent baseband form using Clarke's model as $$E_z = E_o \sum_{i=1}^{N} e^{j\phi_i} \tag{4}$$

$$H_x = -\frac{E_o}{\eta} \sum_{i=1}^{N} \sin\alpha_i e^{j\phi_i}$$

$$H_y = \frac{E_o}{\eta} \sum_{i=1}^{N} \cos\alpha_i e^{j\phi_i}$$

where:

$\alpha_i$=phase angle relative to the carrier plane $E_o$=amplitude of the N plane wave, and
$\eta$=intrinsic wave impedance which is given as:

$$\eta = \sqrt{\frac{\mu}{\epsilon_o}} = 377 \text{ ohms}$$

in which $\mu_o$=free-space magnetic permeability ($4\pi \times 10^{-7}$) H/m and $\epsilon_o$=free-space electric permittivity ($8.854 \times 10^{-12}$) F/m.

Using this model, short-, and long-term fading effects, respectively, may be analyzed by applying the central limit theorem observing that $\alpha_i$ and $\Phi_i$ are independent so that $E_z$, $H_x$ and $H_y$ are complex Gaussian variables. Considering the RF version of equation (4) for the field intensity $E_z$ to $$E_z = E_o \sum_{i=1}^{N} e^{j(\omega_c t + \phi_i)} \tag{5}$$

The real part of $E_z$ is given as $$\text{Re}[E_z] = E_o \sum_{i=1}^{N} \cos\omega_c t \cos\phi_i - E_o \sum_{i=1}^{N} \sin\omega_c t \sin\phi_i \tag{6}$$

Let $A_c = E_o \sum_{i=1}^{N\phi} \cos\phi_i$ and $A_s = E_o \sum_{i=1}^{N\phi} \sin\phi_i$, then Eq. (6) can be written as:

$$\text{Re}[E_z] = A_c \cos\omega_c t - A_s \sin\omega_c t. \tag{7}$$

Since $\phi_i$ is uniformly distributed between 0 to $2\pi$, the mean values of $A_c$ and $A_s$ are zero and the mean square values of $A_c$ and $A_s$ are $$E(A_c^2) = E(A_s^2) = \frac{E_o^2 N}{2} = P_o$$

i.e. the mean received power at the mobile unit. Since $A_c$ and $A_s$ are uncorrelated, $E[A_c A_s]=0$.

Thus, the density of $A_c$ and $A_s$ follows a normal distribution, and the envelope of $A_c$ and $A_s$ is given by:

$$r=(A_c^2+A_s^2)^{1/2} \tag{8}$$

The square root of the sum of the square of two Gaussian functions is the Rayleigh distribution shown in FIG. 5.

$$p(r) = \frac{r}{P_o} e^{(-r^2)/(2P_o)} \tag{9}$$

where:

$2P_o = 2\sigma^2$ is the mean square power of the component subject to short-term fading and $r^2$ is the instantaneous power.

This Rayleigh probability density function describes the first order statistics of the signal envelope of signals shown in FIG. 3, in particular over distances short enough for the mean level to be regarded as constant. First order statistics are those for which a distance is not a factor, and the Rayleigh distribution gives information such as the overall percentage of locations or time for which the envelope lies below a specific value.

Further, the Rayleigh distribution allows for a quantitative description of the rate at which fades of any depth occurs and the average duration of a fade below any given depth. This information is not only valuable for selecting transmission bit rates, word length and coding schemes in wireless communication systems, but also allows to provide information on average fade duration below a specified signal level and thus an analysis of received signals according to the invention.

In particular, an improved approach to estimate disturbances according to the invention is to characterize the Rayleigh phenomenon with the level crossing rate, N(R), of the received signal at a specified signal level R. This signal crossing rate is defined as the average number of times per second that the received signal crosses the level in a positive going direction, i.e. r>0.

$$N(R) = \int_o^\infty r p(R, r) dr \tag{10}$$

where p(R, r) is the joint probability density function of R and r.

Figure 7:
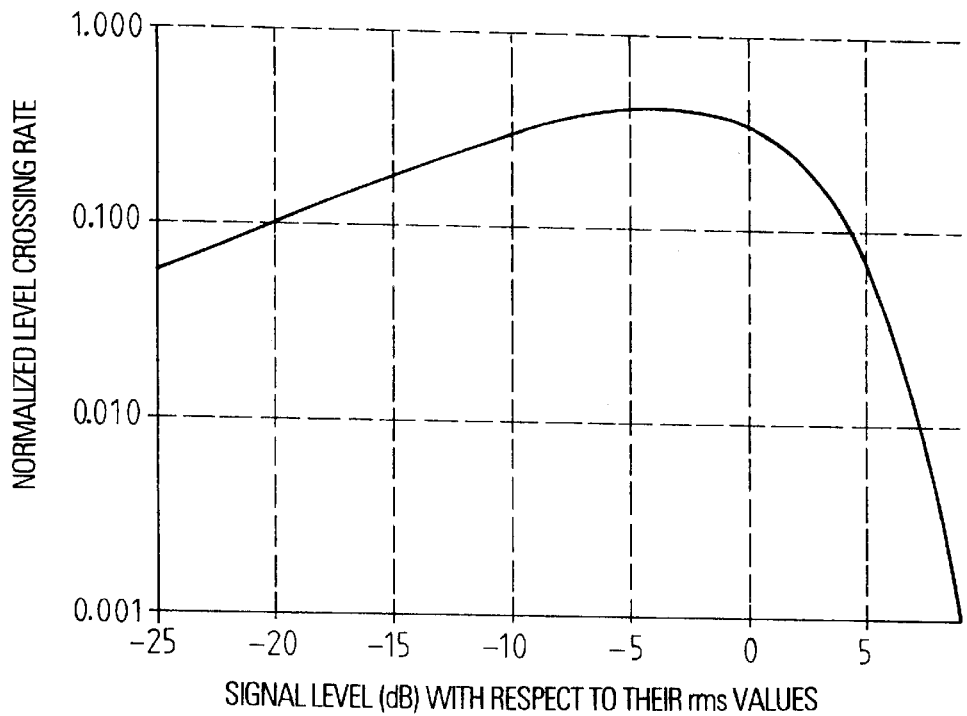
FIG. 7 shows a log-normal distribution according to the long-term fading phenomena.

Using equation (10), the average level crossing rate at a level R shown in FIG. 7 is $$N(R) = \sqrt{\frac{\pi}{\sigma^2}} R f_m e^{\frac{(-R^2)}{2\sigma^2}} \tag{11}$$

Since $2\sigma^2$=means square value, therefore rms=$\sqrt{2}\sigma$ is the root mean square value. The level crossing rate for, e.g., a vertical monopole antenna can then be given as:

$$N(R) = \sqrt{2\pi} f_m \rho e^{-\rho^2} = n_o n_R \tag{12}$$

where:

$$\rho = \frac{R}{\sqrt{2}\sigma} = \frac{R}{R_{RMS}}$$

Thus, $\rho$ is the ratio between the specified level and the rms amplitude of the fading envelope, and $$f m = v/\lambda,$$

$$n_o = \sqrt{2\pi} f_m$$

$$n_R = \rho e^{-\rho^2}$$

$n_R$ is the normalized level crossing that is independent of wavelength and vehicle speed, v=speed of vehicle, and $\lambda$=carrier wavelength.

Preferably, the transmission analyzing unit 30 of the invention uses an approximate expression for N(R) as:

$$N(R) \approx \sqrt{2\pi} v/\lambda \cdot \rho \tag{13}$$

Using the above results the average duration of fades below the specified level R can be found from $$E[\tau_R] = \tau(R) = \frac{\text{prob}[r \leq R]}{N(R)} \tag{14}$$

-continued $$\tau(R) = \frac{e^{\rho^2}-1}{\sqrt{2\pi}\,f_{m\rho}} = \frac{e^{\rho^2}-1}{n_o \rho} \quad (15)$$

An approximate expression for τ(R) to be used by the transmission analyzing unit 30 is given as:

$$\tau(R) = \frac{\lambda}{v}\frac{\rho}{\sqrt{2\pi}} \quad (16)$$

Using the formulas and approximations outlined above, a calculation of the level crossing rate at a level of −10 dB and the calculation of the average duration of a fade for a digital communication system at 900 MHz and a vehicle speed of 24 km/h may be carried out as follows.

Thus, at $$900 \text{ MHz}, \quad \lambda = \frac{3 \times 10^8}{900 \times 10^6} = \frac{1}{3} \text{ m},$$

$$v = 6.67 \text{ m/s}, \quad f_m = \frac{667}{\frac{1}{3}} = 20 \text{ Hz}$$

$n_o = \sqrt{2\pi} f_m = 50$.

From FIG. 7, $n_R = 0.32$ at −10 dB.

N(R)=0.32×50=16.0 fades/sec $\rho e^{\rho^2} = n_R = 0.32$

ρ=0.294

$$\tau(R) = \frac{(1.09-1)}{50 \times 0.294} = 0.0061 \text{ sec} = 6.1 \text{ ms}$$

Using the approximate expressions we get:
fading level=ρ=−10 dB
20 log ρ=−10
ρ=$10^{-10/20}$=0.3162

$$N(R) \cong \sqrt{2\pi} \times \frac{6.67}{\frac{1}{3}} \times 0.3162 = 15.85 \text{ fades/sec}$$

$$\tau(R) \cong \frac{1}{3 \times 6.67}\frac{0.3162}{\sqrt{2\pi}} = 0.0063 = 6.3 \text{ ms}.$$

Using the techniques and formulas outlined above, the transmission analysis unit 30 of the mobile unit 14 according to the second aspect of the present invention allows for an estimation of the Rayleigh phenomena with improved accuracy. Thus, this implementation of the second aspect of the present invention allows to avoid a faulty reassignment of a radio channel due to a misinterpretation of the conditions in the radio channel.

Figure 9:
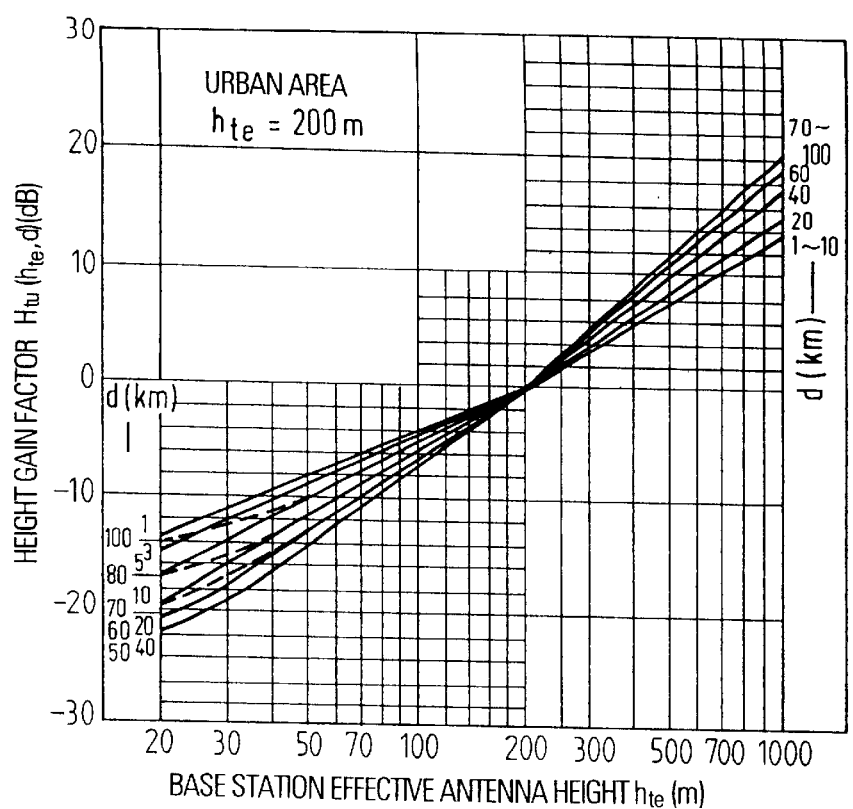
FIG. 9 shows base station height/gain factor in urban areas as function of range.
Figure 21:
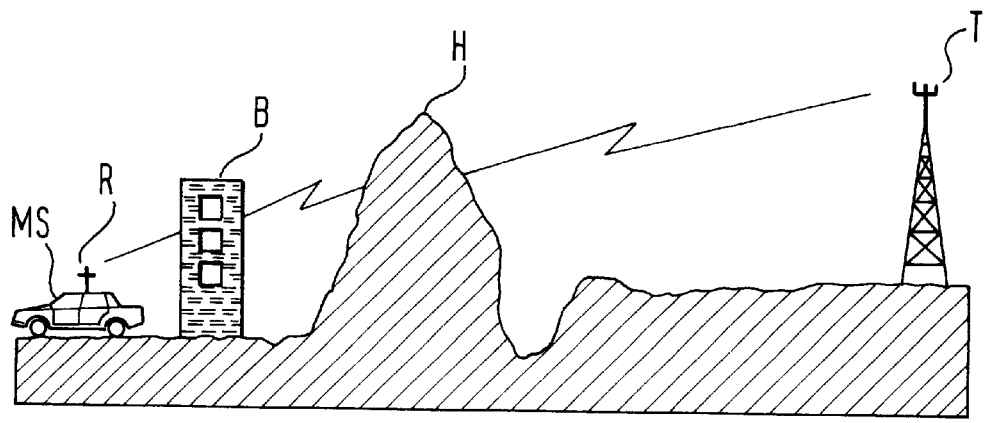
FIG. 21 shows a typical environment where log-normal fading occurs.

As shown in FIG. 9, the second kind of fading to be identified by the transmission analysis unit 30 shown in FIG. 2 is the log-normal fading resulting from shadowing effects, i.e. the use of the mobile unit in an environment with obstacles, e.g., an environment as shown in FIG. 21.

Here, when, e.g., considering a person disturbing a communication link in an office environment the duration may be derived from equation (2) with d=0.2 meters and v=5 km/h to approximately 144 ms. Further, a mobile unit 14 roaming with a train driving through a tunnel would be disturbed for a duration of a few seconds. Overall, the facts generated by log-normal fading cause much longer disturbances of the communication than Rayleigh fading.

Thus, according to the second aspect of the invention it is proposed to identify log-normal disturbances as long lasting disturbances so as to use radio resources for other transmissions where no disturbances prevail. Thus, the utilization of wireless links in-environments which have to cope with fading effects is improved considerably.

To give an impression how much data can be additionally transmitted on a radio link during a time interval that is equal to the duration of the above-referenced log-normal disturbances in the following some calculations are made.

A system transmitting data at 9.6 kilobit per second would transmit 120 byte in 100 milliseconds; accordingly a system transmitting data at 2 megabit per second would transmit 25 kilobyte in 100 milliseconds; finally, a system transmitting data at 155 megabit per second would transmit 1.9 megabyte in 100 milliseconds. Thus, the consideration of log-normal disturbances according to the invention becomes more and more important when increasing the operating frequency to achieve higher bit rates within wireless communication systems.

The next case to be considered according to the invention is the path loss phenomenon. This phenomenon occurs when the received signal becomes weaker and weaker due to an increasing distance between the transmitting apparatus 10 in the mobile communication system and the roaming mobile unit 14. In other terms, with the path loss phenomenon no obstacles exist between the transmitting side and the receiving side, respectively. For this free space case it is assumed that for a given transmitting antenna the power density received at the mobile unit 14 is inversely proportional to the square of a distance d between the transmitting apparatus 10 and receiving mobile unit 14, respectively, and also inversely proportional to the square of the transmitting frequency f. This leads to a space attenuation power loss of $$L_S \sim d^{-2} \cdot f^{-2} \quad (17a)$$

or in [dB]

$$L_s(\text{dB}) = 33.4(\text{dB}) - 20 \log(f_{MHz}) - 20 \log(d_{km}), \quad (17b)$$

where 33.4 (dB) is a constant of proportionality.

It should be noted that this simple formula is valid only for land mobile wireless communication systems nearby the transmitting station. A better approximation due to a non-ideal ground plane is that the mean signal strength decreases with $d^{-4}$.

However, since the mathematical modeling of propagation of radio waves in a real world environment is complicated, empirical models to predict propagation losses have been developed. The empirical and semi-empirical models may be used to calculate the propagation path losses in the urban, sub-urban and rural environments to achieve an improved accuracy for the disturbance detection according to the invention.

According to the invention in case the actual mean value and the actual signal strength significantly differ from the predicted mean value and signal strength, this should be an indication for disturbances and thus to the re-assignment of radio resources to other users of the wireless communication system.

Various experimenters have found that the natural landmade objects effect radio propagation, and they use the following characteristics to classify land object types: building characteristics such as density, height, location and size. It should be noted that no single model is universally applicable in all situations and that the accuracy of a particular model in a given environment depends on the fit between the parameters required by the model and those available for the area concerned. Generally, the goal is to predict the mean signal strength in a small area and the variation and signal strength as the mobile unit moves.

One such prediction model that may be used within the framework of the present invention is Okumuara's model that is based on the pre-space path loss between the points of interest.

Figure 4:
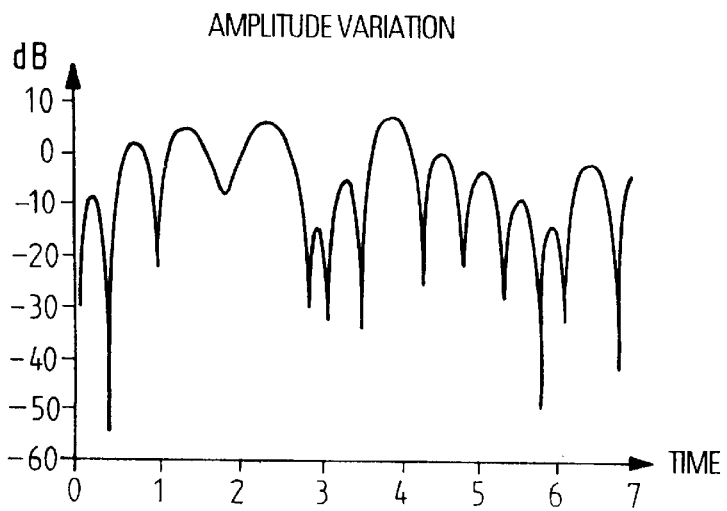
FIG. 4 shows a Rayleigh distribution for short-term fading.
Figure 8:
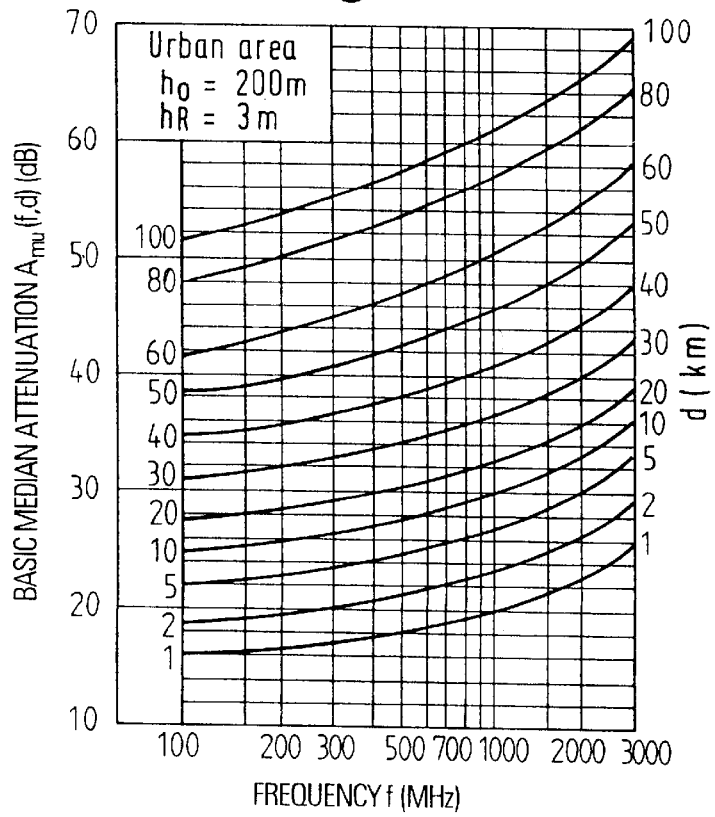
FIG. 8 shows basic path loss relative to free space in urban areas after Okumura.
Figure 10:
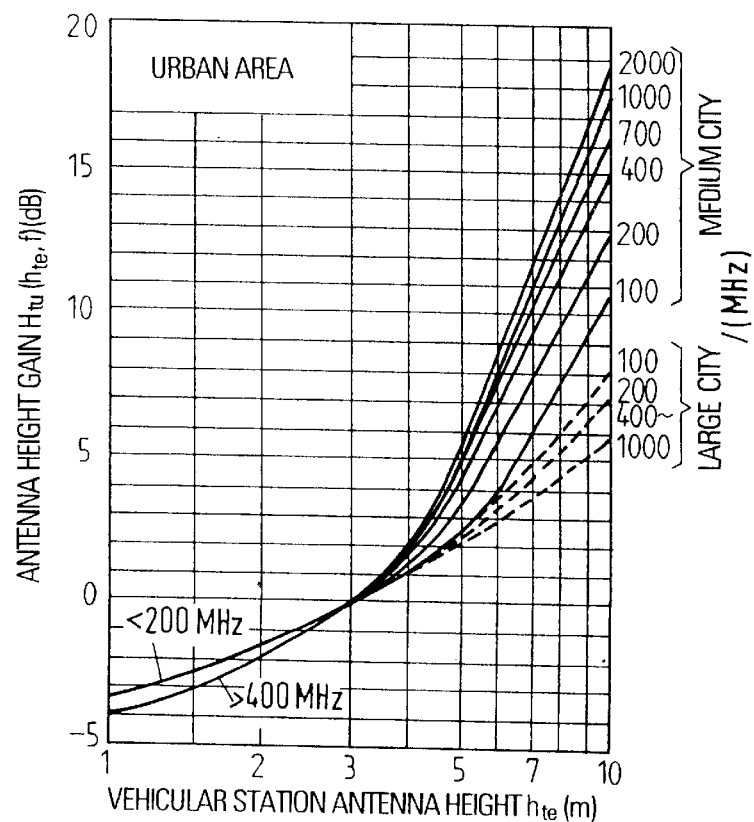
FIG. 10 shows the mobile station antenna height/gain factor in urban areas as a function of frequency and urbanization.

In particular, in the transmission analysis unit 30 the value of $A_{mU}(f,d)$ obtained from FIG. 8 showing a pre-stored diagram is added to the free-space loss. $A_{mU}$ is the median attenuation relative to free space in an urban area over quasismooth terrain with, e.g., a base station effective antenna height $h_{Te}$=200 m and mobile antenna height $h_R$=3 m. $A_{mU}$ is a function of the frequency (in the range 100–3, 000 MHz) and the distance from base station (1–100 km). Correction factors as shown in FIGS. 9 and 10 are applied to account for antennas not at the reference heights. The basic formulation for the model is used in the transmission analysis unit 30 then is $$L_{50} = L_f + A_{mU} + G_{Tu} + G_{Ru} \, dB \tag{18}$$

where:

$L_{50}$ is the median path loss, $A_{mU}(f,d)$=median attenuation relative to free space in an urban area (refer to FIGS. 4, 8)

$L_f$=free-space loss $G_{Tu}$=base station antenna height gain factor, cmp. FIG. 8, and $G_{Ru}$=mobile antenna height gain factor, cmp. FIG. 9.

Additional correction factors, in graphical form, are used to account for street orientation and transmission in suburban and rural areas and over irregular terrain. These corrections are added or subtracted as necessary. Irregular terrain is further classified as rolling hilly terrain, isolated mountain, general sloping terrain, and mixed land-sea path.

Additional models that may be compared to Okumuara's models have been proposed by Sakagmi and Kuboi, Hata, M. F. Ibrahem and J. D. Parsons, and W. C. Y. Lee and these models are described in, e.g., Wireless and Personal Communication System, K. Garg and E. Wilkes, Prentice Hall. It is to be noted that these models can be used accordingly within the framework of the invention and thus they are incorporated here by reference.

Figure 22:
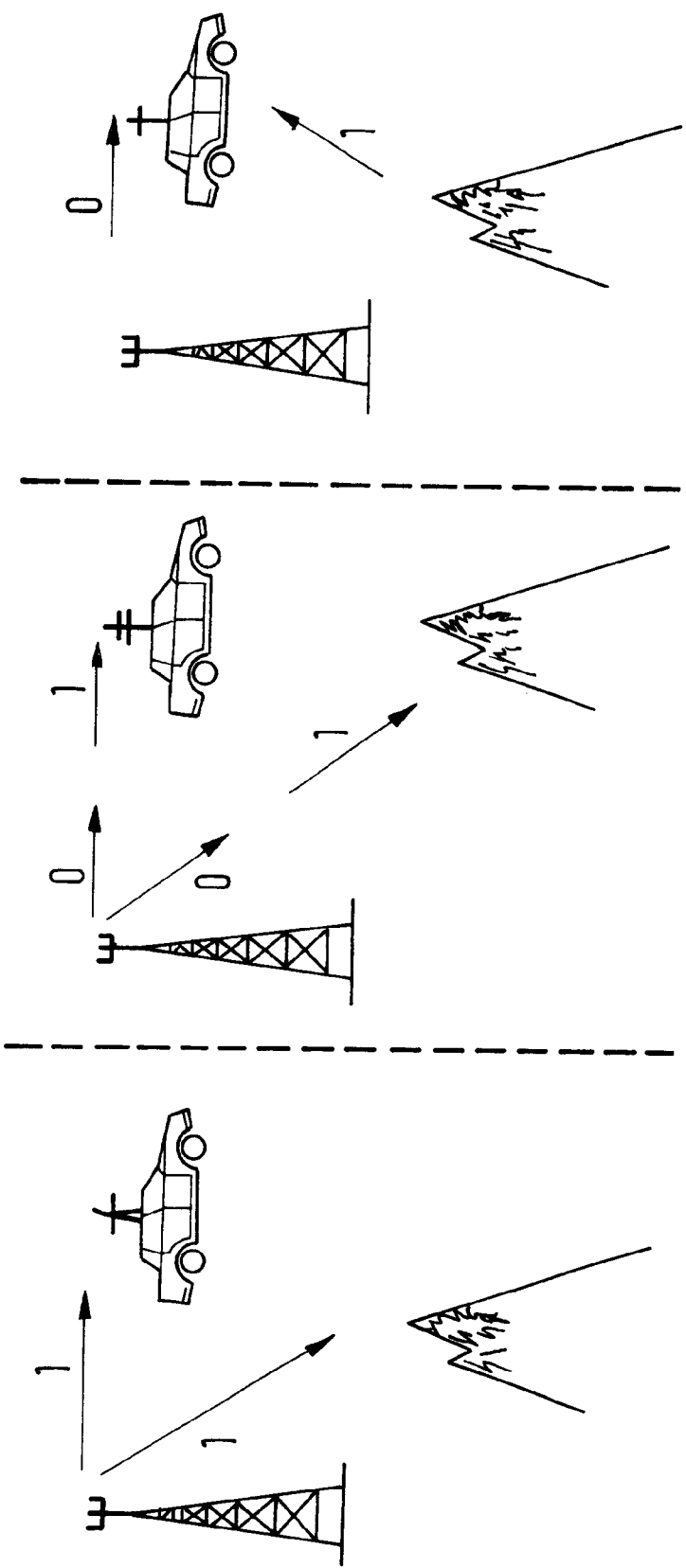
FIG. 22 shows the effect of time dispersion in case a single pulse is initially transmitted, and a typical environment where time dispersion occurs.

Finally, another problem to be tackled by the transmission apparatus 10 for a wireless communication system according to the invention is to estimate time dispersion phenomena shown in FIG. 22. As outlined above, a radio signal follows a plurality of radio paths because of multipath reflection. Since each path has a different path length, the time of arrival for each path is different so that the effect is a smearing and spreading out of a signal referred to as delay spread or time dispersion, as shown in FIG. 22. In a wireless digital communication system this delay spread causes intersymbol interference, thereby limiting the maximum symbol rate of a digital multipath channel. In particular, the main delay spread is defined to $$\tau_d = \frac{\int_0^\infty t D(t) \, dt}{\int_0^\infty D(t) \, dt} \tag{19}$$

where:

D(t) is the delay probability density function and $$\int_0^\infty D(t) \, dt = 1$$

and the typical examples are Exponential:

$$D(t) = \frac{I_e^{\frac{t}{\tau_d}}}{\tau_d}$$

Uniform:

$$D(t) = \tau d/2, 0 \leq t \leq 2\tau_d$$

D(t)=0 elsewhere.

Here, in case the mobile unit may not cope with the dispersion phenomenon, e.g., through diverse reception at the receiver side, this fact may again be retransmitted to the transmitting apparatus 10 through the acknowledgement message so as to achieve a reassignment at the transmission side for a better use of radio resources.

A typical example for such a case would be the GSM system where the net bit rate over the air interface is 270 kilobit per second leading to a bit time of 3.7 microseconds. Thus, one bit corresponds to 1.1 kilometer so that in case there is a reflection from one kilometer behind the mobile unit, the reflected signal will have a 2 kilometer longer path than the direct one. This means that the reflected signal will mix a signal combining two bit times later than the Wanted signal with the wanted signal.

In the above, first and second order models to be used for the estimation of different fading phenomena in the mobile unit have been described. This allows to derive information on the quality of the radio channel already in the mobile unit so that the acknowledgement retransmitted from the mobile unit 14 to the transmission apparatus 10 may provide information about the kind of disturbance on the radio channel, if any. Thus, in the case of a disturbance the transmission apparatus 10 may immediately react to the existing transmission conditions avoiding unnecessary retransmission attempts.

Further, while in the above the present invention has been described in a general way with respect to the different fading phenomena that may arise in a wireless communication systems, in the following specific examples of such a wireless communication systems and the application of the invention thereto will be described.

The first example is related to the standardization of the GSM General Packet Radio Service GPRS according to the European Telecommunication Standards Institute ETSI. GPRS is a new GSM service that provides actual packet radio access for mobile GSM users. According to the GPRS system radio resources are reserved only when there is something to send, and the same radio resource is shared by all mobile units in a cell providing effective use of the scarce resources. GPRS facilitates a variety of application, such as telemetry, train control systems, interactive data access, charging systems, and internet browsing using world wide web.

Contrary to the circuit-switch GSM network, the operation of GPRS is adapted to offer connection to a standard data network using protocols such as TCP/IP and X.25. In particular, the packet data oriented GPRS network infrastructure introduces new functional elements and the concept of mobility management must be adapted.

Figure 12:
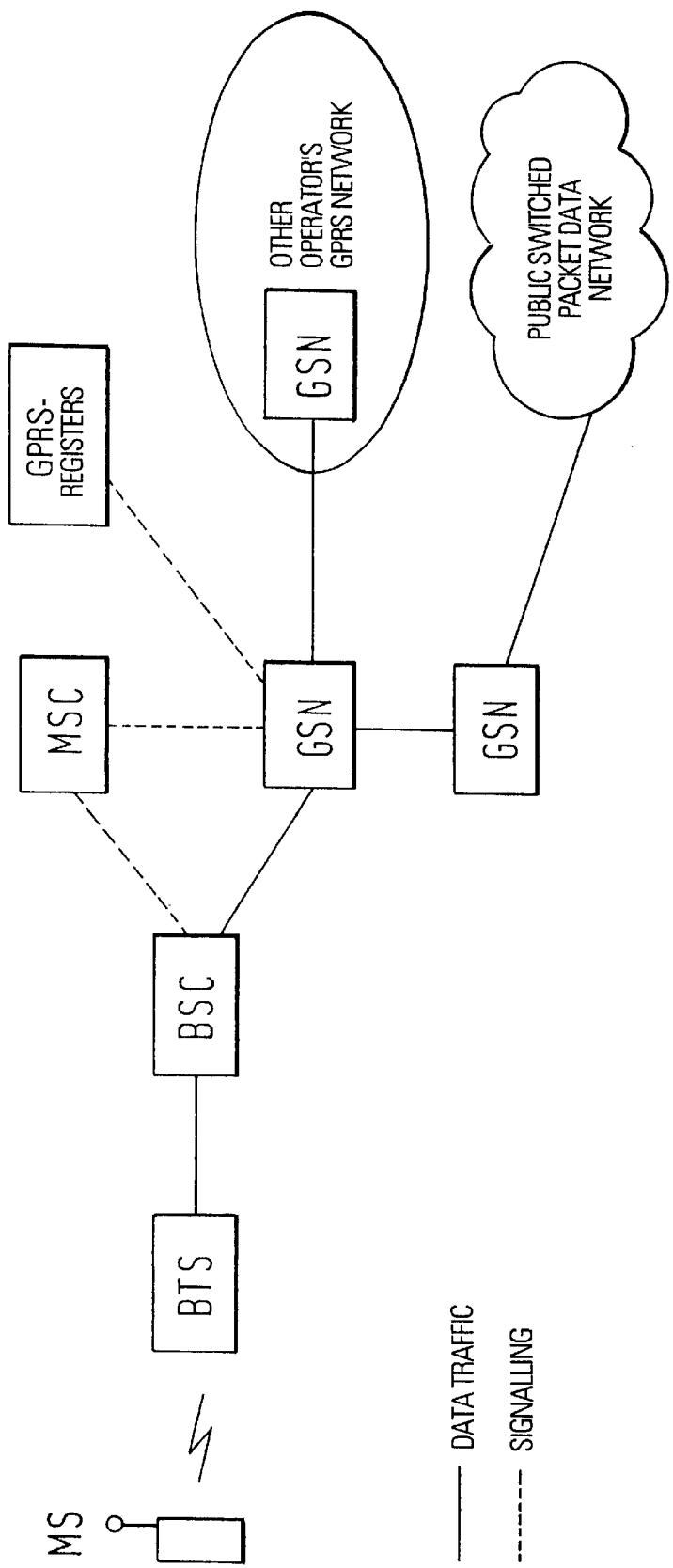
FIG. 12 shows the GSM general packet radio service GPRS reference model.

As shown in FIG. 12, the GPRS packet oriented services implemented according to the present invention provide a bearer service from the boundary of a data network to a GPRS mobile unit 14. Thus, the users of bearer services are, e.g., public network layer software packages IP and X.25. Also, GPRS-specific applications will use the GPRS services.

In the GPRS protocol layering the physical radio interface consists of a flexible number of TDMA time slots, i.e. from 1 to 8, and thus provides a raw data rate of almost 200 kbit/s. A media access control MAC utilizes the resources of the physical radio interface and provides a service to the GPRS logical link control protocol LLC between the mobile unit 14 MS and the serving GPRS support node.

The most important features that are offered by the logical link control protocol LLC are the support of point-to-multipoint addressing and the control of data frame retransmission being a prerequisite for the present invention, as outlined above.

In particular, LLC data frames contain fields for control and addressing, respectively. Usually, only a protocol identifier field and the data field are included into a single LLC frame. This data field may consist of point-to-point protocol PPP data frames providing a media-independent mechanism to exchange different network layer protocol data units over point-to-point link connections and being published by the internet engineering task force IETF.

Using the structure for data frames outlined above, one of the main problems in a GPRS mobile communication system is the routing of data packets to/from the mobile unit 14. This problem can be divided into the two problems, data packet routing and mobility management. Accordingly, the inventive retransmission scheme outlined above is applied to these routing tasks as follows:

In particular, as shown in FIG. 12 with the GPRS wireless communication system the intra operator structure consists of support nodes, that is the GPRS gateway support nodes GGSN and the GPRS serving support node SGSN. The main function of the GPRS gateway support node GGSN involves the interaction with the external data network. The GGSN already mentioned above updates the location directory using routing information supplied by the GPRS serving support nodes SGSN about the mobile stations path and further routes the external data network protocol packet encapsulated according to the GPRS standard to the GPRS serving support node SGSN currently serving the MS.

Figure 13:
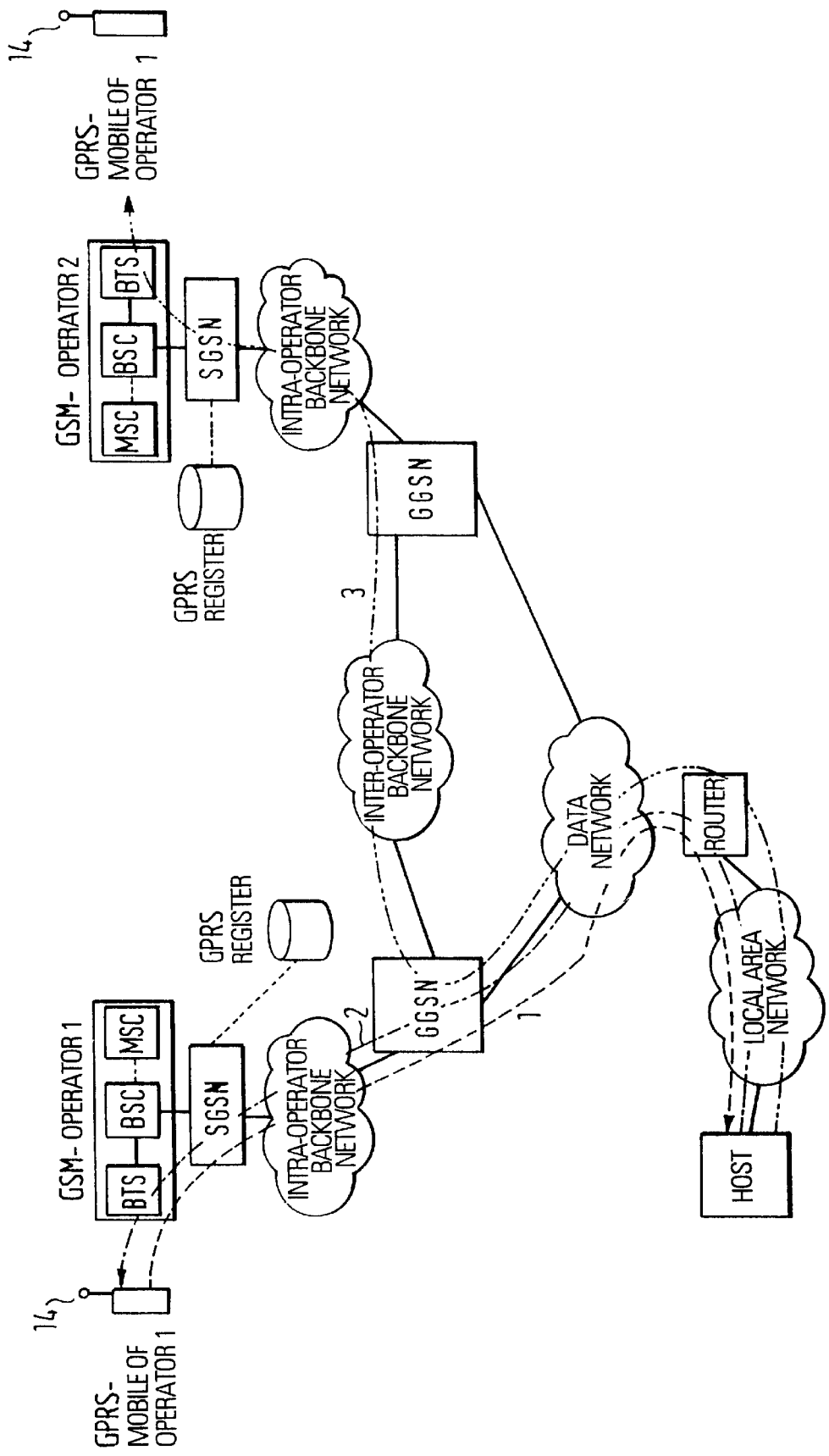
FIG. 13 shows typically routing scenarios within the GSM general packet radio service GPRS illustrated in FIG. 12.

As shown in FIG. 13, the main functions of the GPRS serving support node SGSN, are to detect new GPRS mobile units 14 in its service area, to handle the process of registering this GPRS mobile units 14 MS in the GPRS registers, and to send/receive data packets to/from the GPRS units 14. Also, the GPRS serving support node SGSN keeps a record of a location of the GPRS mobile unit 14 MS inside its service area. The GPRS register acts as a data base from which the SGSN GPRS serving support node SGSN can derive whether a new GPRS mobile unit 14 may join the GPRS network.

As shown in FIG. 13, within the GPRS mobile communication system three different routing schemes and thus three possible applications for the present invention exist: mobile-originated (path 1), mobile-terminated when the GPRS mobile unit 14 is in its home network (path 2), and mobile-terminated when the GPRS mobile unit 14 has roamed to another GPRS network (path 3).

According to the example shown in FIG. 13, the GPRS network consists of multiple GPRS gateway support nodes GSN and an inter-operator backbone network. This intra-operator backbone network connects the support nodes of one operator using operator-specific network protocols that can be different for each operator. Using these inter-networking capabilities, the GPRS gateway support node GGSN may be connected to data network and also to an inter-operator backbone network that connects the GPRS networks of different operators using one standard protocol.

The main benefit of this architecture is its flexibility, scaleability and inter-operability, i.e. each operator may implement an individual backbone network using any protocol, while communications with other GPRS operators are implemented using only one common protocol. This inter-operator protocol is connectionless due to the nature of the traffic, e.g., IPv6 as main backbone protocol proposed by ETSI. Further, in case the present retransmission scheme is additionally applied reliability and effective use of the resources may be improved considerably.

As shown in FIG. 13, from the standpoint of the data network, the GPRS network resembles a subnetwork of a data network. For example, in the internet, the GPRS gateway support node GGSN acts like an IP-router, behind which the entire GPRS network is hidden. Thus, the routing mechanism in the data network is exactly the same as with the normal internet receiver case.

According to the first example of data routing shown in FIG. 13 and being related to path 1, the GPRS mobile unit 14 sends a data packet, i.e. a public switched public data network PSPDN packet data unit PDU to a data network. The PSPDN PDU data packet is sent using the LLC protocol over the air interface to the GPRS serving support node SGSN currently serving the GPRS mobile unit 15. In case the GPRS serving support nodes SGSN has received the data packet error-free, it encapsulates the PSPDN PDU data packet into the GPRS backbone network data packet that is sent to the GPRS gateway support node GGSN handling the traffic from the GPRS mobile unit 14 to data networks. The GPRS gateway support nodes GGSN decapsulate the PSPDN PDU data packet and forwards it to the appropriate data network. Thus, the inventive retransmission scheme may equally be applied to the GPRS serving support node SGSN and the GPRS gateway support node GGSN, respectively.

From this example it can be seen that the invention may be applied to successive transmission units during the transfer of the PSPDN PDU data packet between the GPRS mobile unit 14 and the data network, that is the GPRS serving support node, the GPRS gateway support node, and the receiving unit of the data network. According to the invention each of these units may carry out the steps outlined above so as to detect an errorless data transmission and switch to another transfer path at a transmission error is detected.

As shown in FIG. 13, a second example for the application of the invention is related to path 2 where a host in a data network is sending a PSPDN PDU data packet to the GPRS mobile unit 14 located in the home GPRS network. Here, compared to the first example outlined above, the PSPDN PDU data packet is routed in reverse direction using the routing mechanisms in the data network until the PSPDN PDU data packet arrives at the GPRS gateway support node GGSN. In the GPRS gateway support node the PSPDN address of the GPRS mobile unit 14 is extracted and the current location of the GPRS mobile unit 14 is mapped. Then, routing of the PSPDN PDU data packet in the home GPRS network is carried out.

In particular, the PSPDN PDU data packet is first encapsulated into a backbone network and then sent to the GPRS serving support node SGSN currently serving the GPRS mobile unit 14. Of course, the inventive transmission scheme equally applies to this case. Here, the GPRS serving support nodes SGSN finally removes the backbone network related data and the original PSPDN PDU data packet is sent to the GPRS mobile unit 14 using the MAC/RLC or LLC protocol as outlined above.

The last example shown in FIG. 13 relates to path 3 and is almost identical to example 2. However, here the GPRS mobile unit 14 has roamed to another GPRS network and the home GPRS network must send the PSPDN PDU data packet over the inter-operator backbone network to the visited GPRS network. Thus, according to this example there is involved an additional GPRS gateway support node to provide the data packet to the roaming GPRS mobile unit 14. Then, the visited GPRS network routes the PSPDN PDU data packet further to the appropriate GPRS serving support node, as outlined above with respect to the second example.

Further, packet transmission with retransmission according to the invention does not only take place with respect to data transfer according to the examples 1 to 3 illustrated in FIG. 13, but also with respect to GPRS mobility management.

Here, it should be noted that data packets are transmitted between a GPRS mobile station MS and the GPRS network only in case the GPRS mobile station MS is in the active state. In this active state, the GPRS serving gateway support node SGSN knows the cell location of the GPRS mobile station MS.

Therefore, in case the GIPRS serving support node SGSN wants to send a data packet to a GPRS mobile station MS being in the standby state, this GPRS mobile station MS must be paged. Since the GPRS serving support node SGSN knows the routing area in which the GPRS mobile unit 14 is located, the packet paging data packet is sent to this routing area. After receiving the packet paging data package, the GPRS mobile station MS gives its cell location to the GPRS serving support node SGSN to establish the active state.

According to the invention, in case the transmission of the packet paging data packet is not successful, the mechanisms for retransmission outlined above may be used either to retransmit the packet paging data packet or to reassign the transmission channel to another GPRS mobile station MS.

Also data packet transmission to an active GPRS mobile unit 14 is initiated by a packet paging data packet. Here, the data packet transmission according to the present invention proceeds immediately after packet paging through the channel indicated by the packet paging message. The purpose of the packet paging message is to simplify the process of receiving data packets since the GPRS mobile station MS must only listen to packet paging messages instead of all data packets in all channels.

Contrary to that, in case the GPRS mobile unit 14 has a data packet to be transmitted, access to the up link channel is needed, so that the sender/receiver of the GPRS transmission apparatus receives the data packet. This up link channel is shared by a plurality of GPRS mobile station MS and its use is allocated by a base station subsystem BSS in the related GSM mobile communication system. Here, the GPRS mobile station MS requests use of the up link channel through a packet random access message. The base station subsystem BSS allocates an unused channel to the GPRS mobile station MS and sends a packet access grant message in reply to the packet random access message.

Therefore, according to the present invention the retransmission scheme provided to improve radio resources may also be used within the GSM communication system, e.g., any base station subsystem BSS being provided therein, to enhance the resource utilization of a GPRS network relying on the infrastructure thereof.

Figure 14:
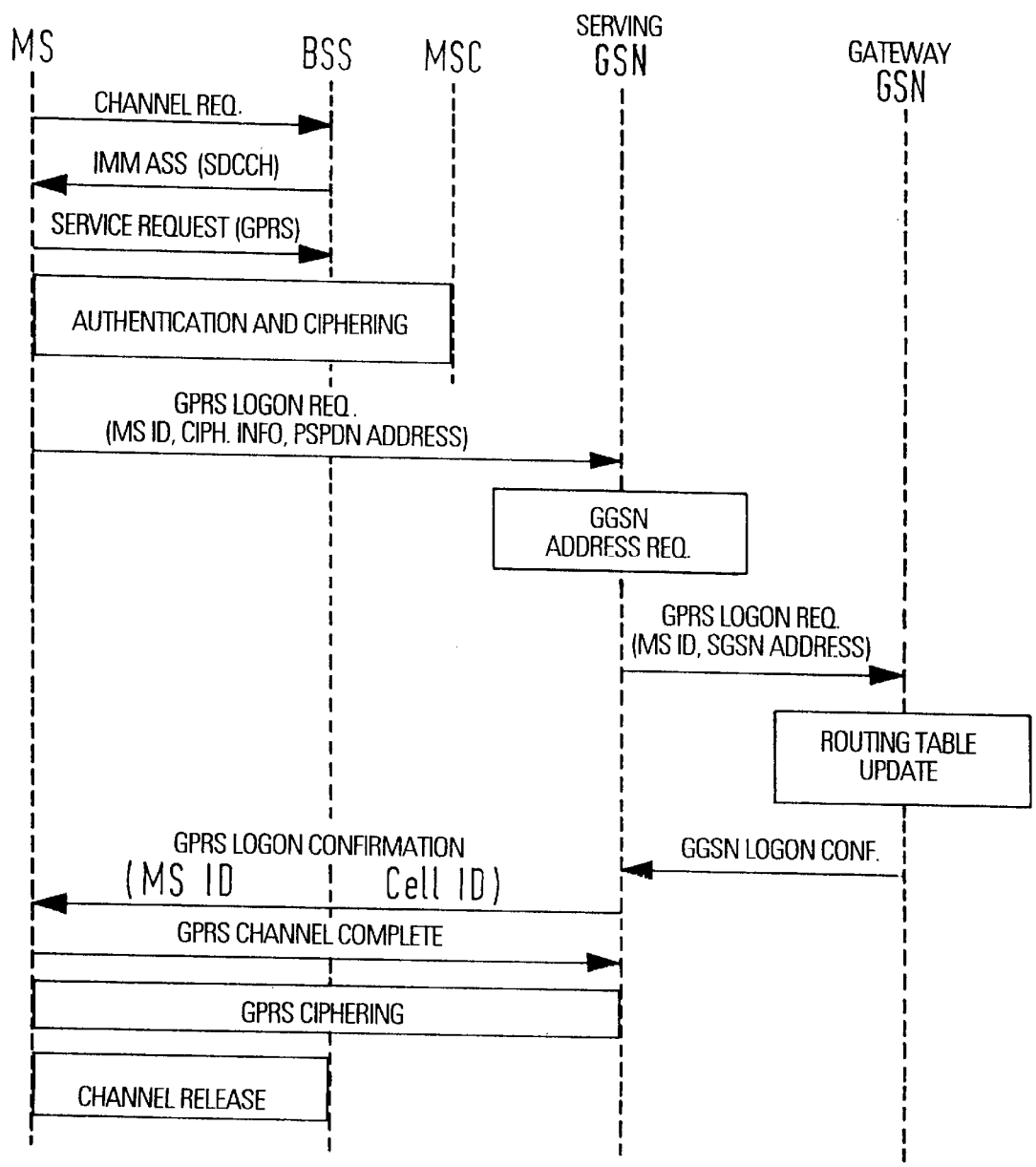
FIG. 14 shows the log-on procedure as one example of GPRS mobility management with data packet transfer according to the invention.

Another case of data transfer between a GPRS mobile unit 14 and different network nodes according to the invention and being related to GPRS mobility management is the execution of the GPRS log on procedure when the GPRS mobile station MS is switched on, as shown in FIG. 14. The main objective of this log on procedure is to send the PSPDN address of the GPRS mobile station MS to the GPRS network, to report on the current whereabouts of the GPRS mobile station MS, create entries for the assigned PSPDN address in the routing table of the GPRS gateway support node GGSN, and initiate charging and statistical procedures, respectively.

In particular, during the GPRS log on procedure using the inventive retransmission scheme the context of the logical link between the GPRS mobile station MS and the GPRS serving support node SGSN is established using the GSM stand alone dedicated control channel SDCCH as carrier. During context establishment the GPRS mobile station MS is authenticated and ciphering parameters are exchanged between the GPRS mobile unit 14 GPRS serving support node SGSN. This registration is forwarded to the GPRS gateway support node in which the location of the GPRS mobile station MS is updated. Here, the GPRS gateway support node GGSN may inform a previous GPRS serving support node SGSN to remove the GPRS mobile station MS from the previous registers. In case the GPRS log on procedure is successful, the GPRS mobile station enters the standby state. Finally, the GPRS mobile station MS can exit the GPRS service by initiating the GPRS log off process.

Another data packet signalling process with packet retransmission according to the invention is shown in FIG. 15 and is related to the GPRS routing updating process, in particular for an inter-SGSN routing area. As shown in FIG. 15, a cell based routing updating procedure is invoked when an active GPRS mobile unit 14 enters a new cell. In this case the GPRS mobile unit 14 sends a short message data packet containing information about its move, i.e. the identity of the GPRS mobile unit 14 and its new location. The short message data packet is transferred through GPRS transmission channels to its current GPRS serving support node SGSN.

Thus, it can be easily seen that the present invention of reassigning a transmission channel in case of specific transmission errors is easily adaptable also to this case of packet oriented data transfer and in case the transmission is not executed successfully the GPRS serving support node SGSN may switch to provide services to another GPRS mobile station MS roaming in its serving area.

Figure 15A:
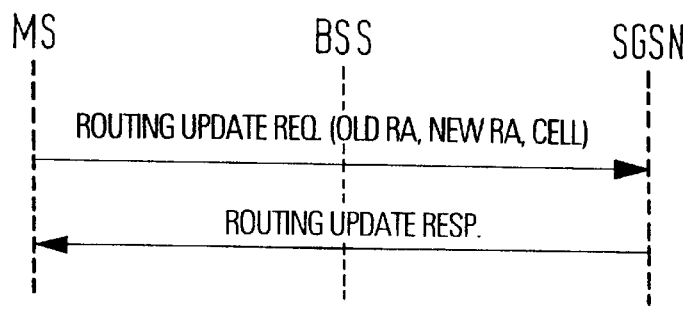
FIG. 15 shows the GPRS routing updating process as another example of GPRS mobility management with data packet transfer according to the present invention.

As shown in FIG. 15, in case a GPRS mobile unit 14 moves from one routing area to another in the service area of one GPRS serving support node SGSN, it must again perform a routing update as shown in FIG. 15a. In case the information is transmitted successfully and the updated procedure is finished, there is initiated another data packet transfer for a corresponding response message.

Figure 15B:
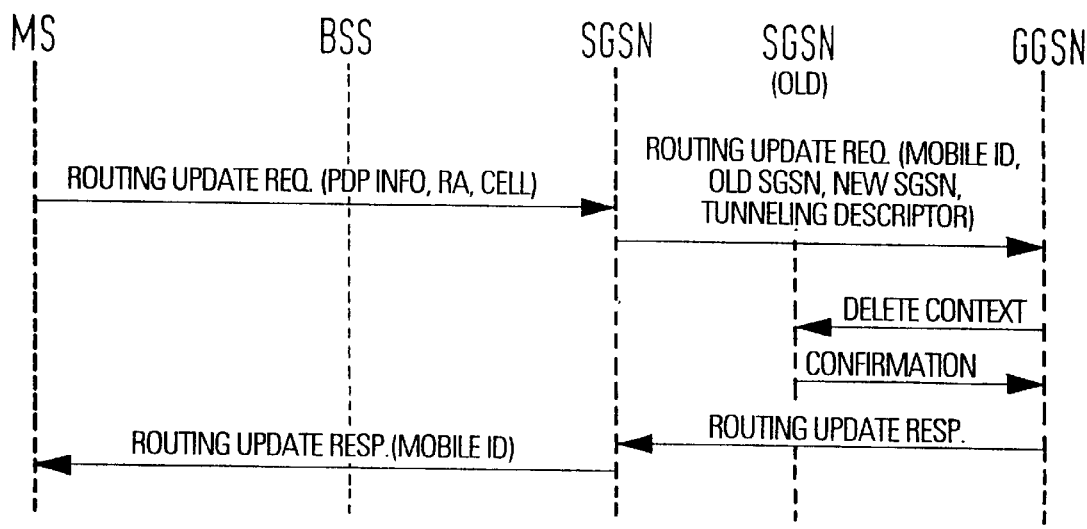

Finally, the inter-SGSN routing update shown in FIG. 15b is the most complicated of the three different routing updates. Here, the GPRS mobile station MS changes from one SGSN area to another, and it must establish a new connection to a new GPRS serving support node SGSN. As shown in FIG. 15b, this means creating a new logical link context between the GPRS mobile station MS and the new GPRS serving support node SGSN, as well as informing the GPRS gateway support node GGSN about the new location of the GPRS mobile station MS. Here, too, short message data packets may be transmitted using the inventive retransmission scheme.

As can be seen from the above, according to the invention a great variety of packet transmission processes are carried out within the GPRS network. Here, the loss of a data packet is, in case it is detected, treated through a repeated transmission of the data packet. Also, in case these retransmisisons are unsuccessful for longer times, the inventive GPRS communication system assumes that the disturbance is caused by, e.g., a longer lasting transmission error or a longer lasting fading effect.

To give an example, if in the inventive GPRS network a data packet cannot be transmitted for a duration being longer than 20 ms, the GPRS network assumes that the duration of the transmission error will last 100 milliseconds or longer, as the reason for the disturbance is, e.g., log-normal fading. Within the inventive GPRS network the remaining time of 80 ms is not used for additional retransmission trials, but used to send data packets of any kind to other GPRS mobile units which are reachable. Here, the amount of data packets that may be transmitted depends of course on the use of transmission rate.

In addition, according to another preferred embodiment of the present invention location specific data may be transmitted through the mobile station 14 to the transmission apparatus 10 shown in FIG. 1. In case the mobile station MS roams in a region in which per se a successful transmission may not be expected this transmission may be interrupted without the repeated attempts only on the basis of the location specific information.

Figure 16:
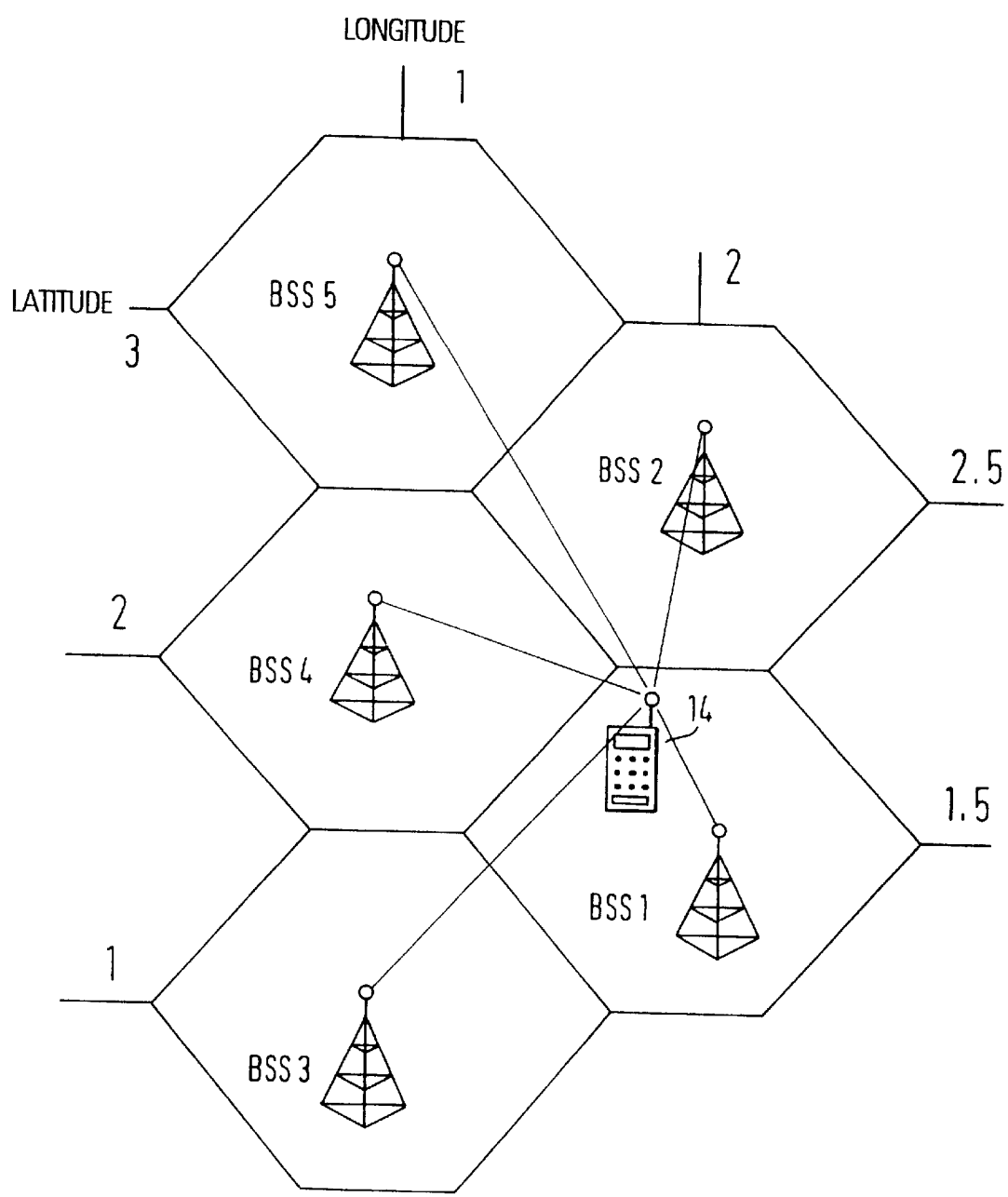
FIG. 16 shows an embodiment of the present invention according to which the mobile station derives location specific data to evaluate the chances for a successful transmission without repeated re-transmission attempts.

One such example hereto is shown with respect to FIG. 16.

As shown in FIG. 16, in a region with radio transmission to the GSM network the mobile station 14 receives location specific information via a cell broadcast channel CBCH, a broadcast control channel BCCH or in addition a base station identity code BSIC from at least one base station sub-system BSS. Therefore, in the mobile station 14 always the precise information about the current location about the mobile station in the GSM network is available.

Further, a mobile station MS usually receives location specific information from the base station sub-system BBS 1 covering the area in which it roams and also from neighboring base station sub-systems BSS 2 to BSS 5.

The location specific information may be used to estimate the geographic position of the mobile system MS and also to transmit the location specific information to the transmission apparatus 10 shown in FIG. 1. According to the example shown in FIG. 16, the a mobile station MS roams in a cell 1 and it receives direct transmission information from a base station sub-system BSS1. In addition, the mobile station MS also receives transmission information from neighboring cells 2 to 5 via related base station sub-systems BSS2 to BSS5.

One example for the calculation of location specific information is shown in FIG. 16. Assuming that the latitudes of the cells 1 to 5 are 1.5, 2.5, 1,2,3, respectively, and that the corresponding longitude are 2,2,1,1, respectively, the estimated longitude and latitude of the mobile station MS is 2 and 1.4, respectively.

According to this preferred embodiment the location information is then transmitted to the transmission apparatus 10 in which the further transmission quality is determined in advance in complience with the location information. One example would be that the mobile station MS is moving towards a tunnel wherein transmission attempts per se will not be successful and thus should be generally avoided, to avoid any loss in transformation capacity and time.

Further, as outlined above the present invention is not restricted to a GPRS network, but may equally apply to an ATM wireless communication system. Therefore, the present invention supports the on-going evolution of the worldwide wireless structure towards increasing support for broadband multimedia services and the proliferation of cellular based radio access. Also, according to the invention there is considered effective usage of radio resources for the increased demand for broadband services driven by the usage of on-line services, internet access, worldwide web sites, video on demand, and multimedia archiving where ATM virtual connections are the basis for the on-going developments.

Figure 17:
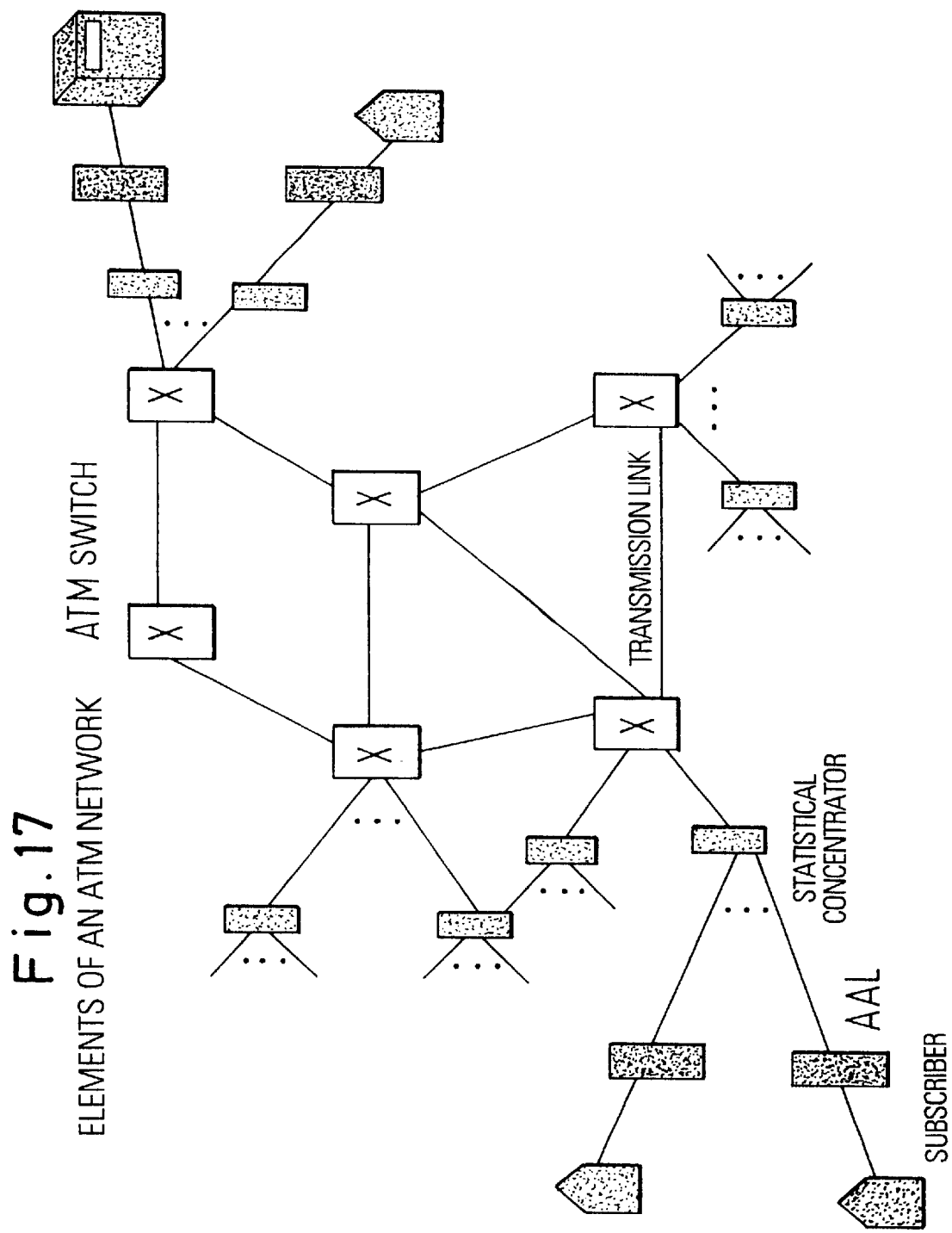
FIG. 17 shows a high level block diagram of a wireline ATM network.

FIG. 17 shows a high-level block diagram of a wireline ATM network forming the basis for an ATM wireless communication system according to the present invention. Here, the principle components are the ATM adaptation layer AAL, statistical concentrators, ATM switches, transmission links, and control computers. The statistical concentrators and ATM switches contain smoothing buffers to temporarily store arriving data packets that cannot be immediately delivered because in the case of a concentrator, data packets generated by active users arrive in parallel, but are delivered to the output sequentially, or in case of a switch, several data packets may arrive in parallel for the same output, but are delivered to that output sequentially. Thus, as a function of time the number of data packets stored in and transmitted by any smoothing buffer will rise and fall in accordance with end user data packet generation patterns. A typical example for data packets transmitted that way are 53 byte ATM data packets.

Further, the control computers limit the traffic intensity on the various links such that quality of service QoS guarantees are maintained. For this reason, prior to receiving service, a given user must request a connection to the intended receiver and then the admission controller will attempt to find a route through the network. If such a route can be found, a virtual connection number is assigned for that route and the routing tables in the intervening switches are provided with instructions for routing of each ATM data packet bearing that virtual connection number within its cell header. The user is then free to communicate over this new established virtual connection.

In addition, as shown in FIG. 17 the AAL is responsible for converting a user's data packet message into a sequence of ATM data packets and for reassembling ATM data packets into complete messages. Here, a message may be an individual data packet, cmp. data or image, or a continuous bit stream, e.g., voice or video.

Contrary to the packet switched GPRS wireless communication system where each connection enjoys an on demand access to the resources reserved for that connection, the ATM wireless communication system is a virtual connection oriented network where resources are not assigned on an exclusive basis, but rather are statistically shared among multiple connections.

Overall, an ATM relies on virtual path VP to segregate the collection of virtual connections into independently manageable groups. The virtual connections sharing a common or virtual path VP are called virtual channels. The VP concept is vital for creation of a viable admission policy since it decomposes a large job into independent sets of much smaller tasks.

Figure 18:
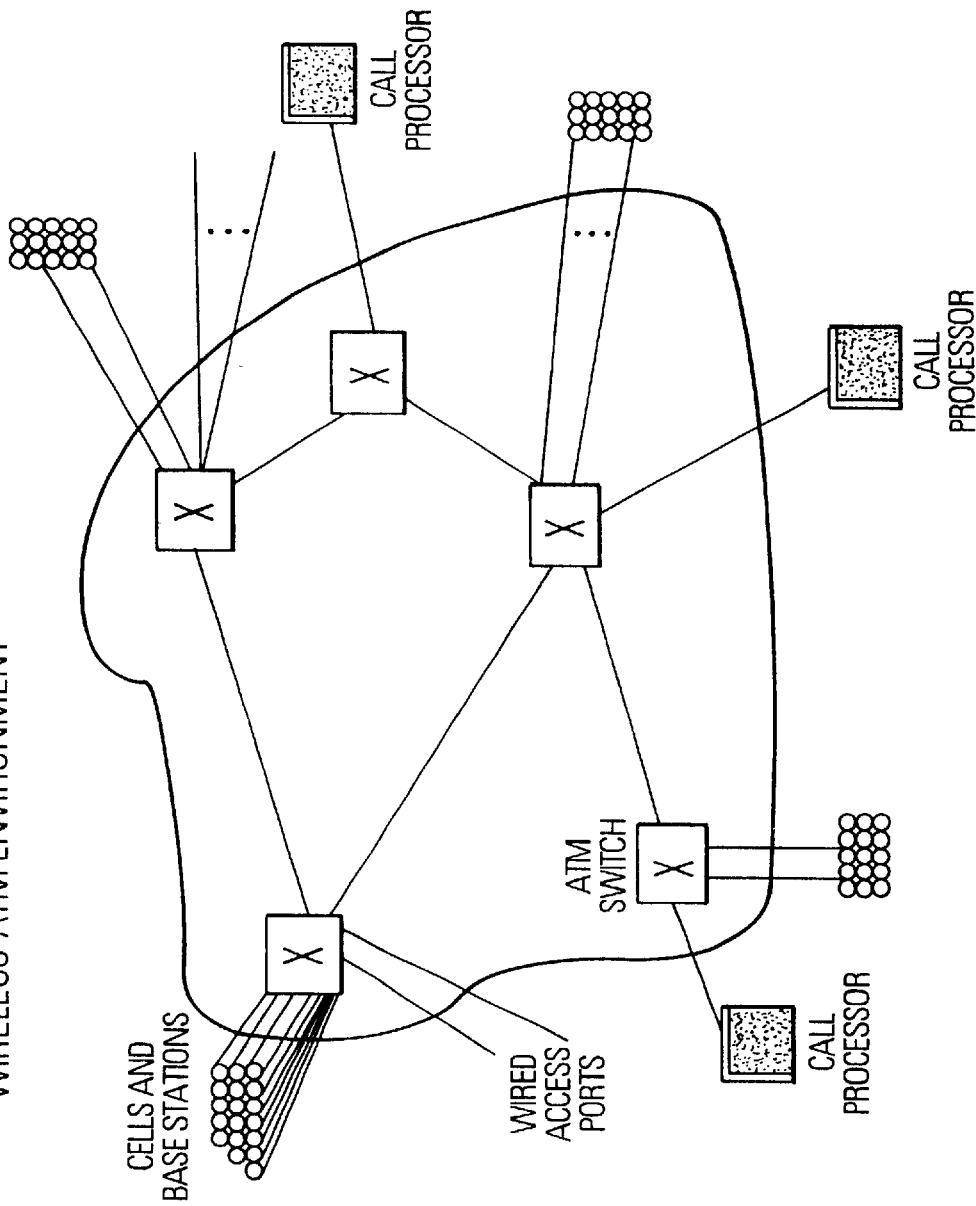
FIG. 18 shows an ATM wireless communication system using the retransmission scheme according to the present invention.
Figure 19:
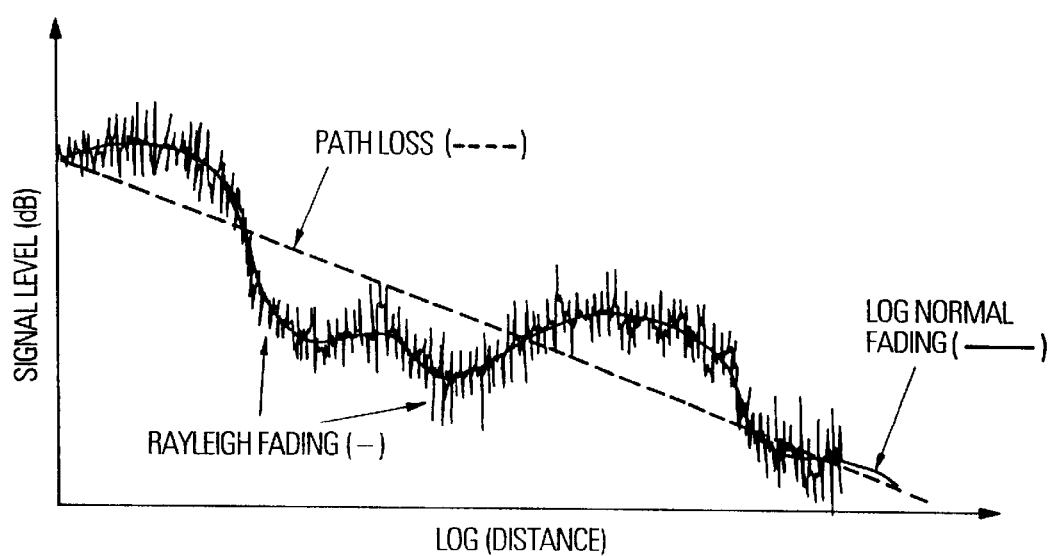
FIG. 19 shows a graph of signal level versus distance from the transmitting antenna.
Figure 20:
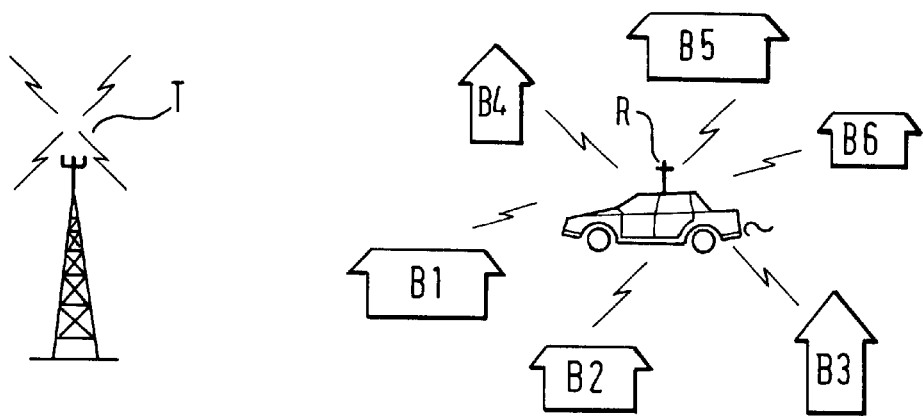
FIG. 20 shows a typical environment where Rayleigh fading occurs.

As shown in FIG. 18, the ATM wireless communication system is strongly related to the elements of an ATM network as shown in FIG. 17. In particular, three issues must be addressed to enable an ATM wireless communication network.

The first is the reduction or elimination of the impairment of a radio link between the mobile unit and the base station, as extensively discussed above with respect to FIGS. 2 to 9. The second is the creation within each cell of a high speed radio channel that can be accessed on demand by the base station and each mobile unit within this cell. Finally, an effective radio cell handle process enables the employment of a large number of smaller cells and thus a higher capacity per user.

As outlined above, a major focus of the present invention is on the handling impairments of the radio link between the mobile unit and the base station. While slowly varying shadow fading can be avoided by handling a mobile connection off to a cell site offering less shadowing, Rayleigh fading and co-channel interference represent impairments that are much too dynamic to be treated by cell hand off.

While the present invention has been described using a general description of an ATM wireless communication system, it is easily adapted to the different ATM wireless communication systems currently installed. Examples are the 5.2 GHz band called SUPERNET, an ATM wireless LAN communication system above 10 GHz specified for Europe by the European Telecommunication Standards Institute ETSI, and also the 3 ISM bands open by the Federal Communications Commission FCC in the United States according to the 950 MHz band, the 2.4 GHz band, and the 5.8 GHz band, respectively. Further, another example would be the 1.9 GHz band opened by the FCC for PCS operations.

What is claimed is:

1. A transmission apparatus for a wireless communication system, comprising:
   a) sending and receiving means to transmit data packets to and from at least one roaming mobile unit connected to the transmission apparatus via at least one radio channel,
   b) transmission monitoring means to determine whether a transmission between the sending and receiving means and the mobile unit has been carried out successively,
   c) transmission channel assignment means adapted to reassign a transmission channel to another mobile unit when the transmission monitoring means determines an erroneous transmission and a repeated transmission of the data packet is evaluated by the transmission monitoring means to be not successful, wherein the transmission channel is reassigned based on an acknowledgment received from the mobile unit, the acknowledgment including a disturbance classification and quantification.

2. The transmission apparatus according to claim 1, further comprising a channel status evaluation means to avoid a reassignment to a transmission channel currently being blocked.

3. The transmission apparatus according to claim 2, further comprising a transmission request means to identify the next channel to be used for transmission during operation thereof.

4. The transmission apparatus according to claim 3, wherein the transmission monitoring means is adapted to continuously initiate a retransmission through the transmission channel assignment means until a prespecified duration has elapsed.

5. The transmission apparatus according to claim 4, wherein the prespecified duration is defined as Rayleigh fading duration.

6. The transmission apparatus according to claim 1, wherein the transmission channel assignment means reassigns a transmission channel selectively in dependence on the kind of disturbance, Rayleigh fading, log-normal fading, path loss fading, respectively.

7. The transmission apparatus according to claim 1, wherein is a base station or a support node for a general packet service system.

8. The transmission apparatus according to claim 1, which is integrated into a mobile switching center of a wireless communication system.

9. The transmission apparatus according to claim 1, wherein the sending and receiving means transfers logical link control data frames comprising control and addressing information, respectively.

10. The transmission apparatus according to claim 1, wherein the sending and receiving means transmits point-to-point protocol data frames.

11. The transmission apparatus according to claim 1, wherein the sending and receiving means transmits packet switched public data.

12. The transmission apparatus according to claim 1, wherein the sending and receiving means transmits packet paging data packets.

13. The transmission apparatus according to claim 1, which is a gateway support node of a general packet radio service communication system.

14. The transmission apparatus according to claim 1, which is a host in a data network.

15. The transmission apparatus according to claim 1, which is a base station subsystem in a GSM digital communication network supporting packet oriented data services and wherein data packets correspond to packet random access messages and packet access ground messages respectively.

16. The transmission apparatus according to claim 13, wherein the sending and receiving means transmits data packets being related to GPRS mobility management as log on and routing update process, respectively.

17. The transmission apparatus according to claim 1, which is a buffer in a statistical concentrator, a buffer in an ATM switch, a control computer, and/or an adaptation layer means in an ATM wireless communication network, respectively.

18. The transmission apparatus according to claim 17, wherein the sending and receiving means transmits data packets as 53 byte ATM data packets.

19. A mobile unit for a wireless communication system, comprising:
   a) sending and receiving means to transmit data packets to and from a transmission apparatus, respectively,
   b) signal tracing means to trace the level of the signal received by the sending and receiving means,
   c) transmission analyzing means adapted to identify a disturbance for the signal received by the sending and receiving means and to determine a quantification of the disturbance,
   d) acknowledgment set up means adapted to set up an acknowledgment with respect to the disturbance classification and quantification output by the transmission analyzing means and to send the acknowledgment via the receiving and sending means on occurrence of a disturbance.

20. The mobile unit according to claim 19, wherein the transmission analyzing means is adapted to identify a Rayleigh fading by estimating the time between two local minima of the received signal and comparing this time with a prespecified value.

21. The mobile unit according to claim 19, wherein the transmission analysis means is adapted to estimate the Rayleigh fading phenomena according to an approximate expression for a level crossing rate of the received signal with respect to a prespecified analysis level.

22. The mobile unit according to claim 19, wherein the transmission analysis means is adapted to estimate a lognormal fading phenomena by tracing the local mean value of the signal received at the sending and receiving means of the mobile unit.

23. The mobile unit according to claim 19, wherein the transmission analysis unit is adapted to identify a path loss phenomena on the basis of a global mean value of the signal received at the sending and receiving means of the mobile unit.

24. The mobile unit according to claim 19, wherein the transmission analysis means is adapted to estimate a path loss phenomena on the basis of the distance between the mobile unit and the respective transmission apparatus according to $$L_s(dB)=33.4(dB)-20\log(f_{MHz})-20\log(d_{km}).$$

25. The mobile unit according to claim 19, wherein the transmission analysis means is adapted to estimate the path loss phenomena on the basis of Okumuara's model.

26. A method to transmit data packet in a wireless communication system, comprising the steps of:

a) transmitting data packets between a transmission apparatus and a mobile unit, respectively, b) determining whether a data packet transmission between the transmission apparatus and the mobile unit has been carried out successfully, and c) reassigning a transmission channel to another mobile unit when it is determined that the transmission of the data packet was not successful and a retransmission of a data packet is estimated to be not successful based on an acknowledgment received from the mobile unit, the acknowledgment including a disturbance classification and quantification.

27. The method according to claim 26, further comprising the step of continuously transmitting the same data packet between the transmission apparatus and the mobile unit until a predetermined time has elapsed indicating a long duration disturbance on the radio channel therebetween.

28. The method according to claim 26, further comprising the step of retransmitting a data packet only when the mobile unit indicates disturbances on the transmission channel through the acknowledgment.

29. The method according to claim 28, further comprising the step of determining the kind of disturbance on the radio channel in the mobile unit in dependence on local receiving conditions.

* * * * *